March 1, 1966  W. G. GERHART ETAL  3,237,745
VENDING MACHINE
Filed June 7, 1963  20 Sheets-Sheet 1

INVENTOR.
Walter G. Gerhart
BY Horace H. Smee

Arne J. Fors
AGENT

INVENTOR.
Walter G. Gerhart
Horace H. Smee
BY
*Arne J. Fors*
AGENT

INVENTOR.
Walter G. Gerhart
Horace H. Smee
BY
AGENT

March 1, 1966

W. G. GERHART ETAL 3,237,745

VENDING MACHINE

Filed June 7, 1963

INVENTOR.
Walter G. Gerhart
BY Horace H. Smee

AGENT

INVENTOR.
Walter G. Gerhart
BY Horace H. Smee

AGENT

March 1, 1966 W. G. GERHART ETAL 3,237,745
VENDING MACHINE
Filed June 7, 1963 20 Sheets-Sheet 6

INVENTOR.
Walter G. Gerhart
BY Horace H. Smee

Arne J. Fors
AGENT

March 1, 1966    W. G. GERHART ETAL    3,237,745
VENDING MACHINE

Filed June 7, 1963      20 Sheets-Sheet 7

INVENTOR.
Walter G. Gerhart
BY Horace H. Smee

AGENT

March 1, 1966  W. G. GERHART ETAL  3,237,745
VENDING MACHINE

Filed June 7, 1963  20 Sheets-Sheet 10

INVENTOR.
Walter G. Gerhart
BY  Horace H. Smee

AGENT

March 1, 1966 W. G. GERHART ETAL 3,237,745
VENDING MACHINE
Filed June 7, 1963 20 Sheets-Sheet 11

INVENTOR.
Walter G. Gerhart
BY Horace H. Smee

Arne J. Fors
AGENT

INVENTOR.
Walter G. Gerhart
BY Horace H. Smee

AGENT

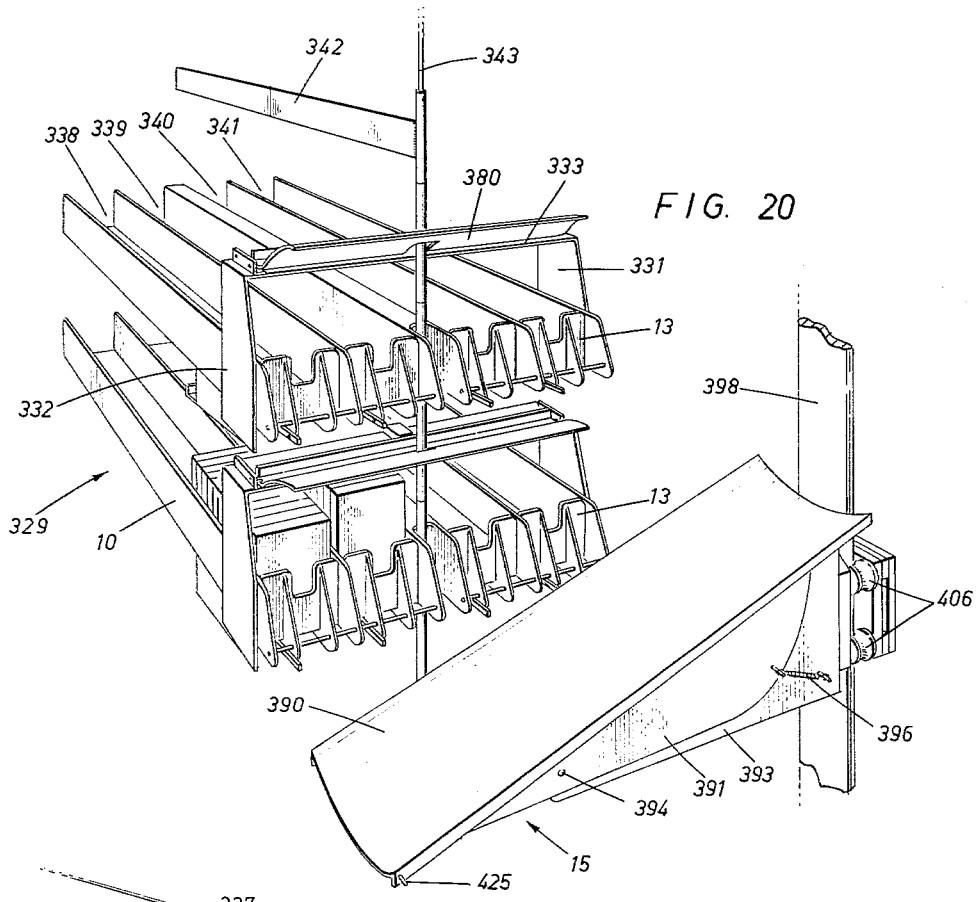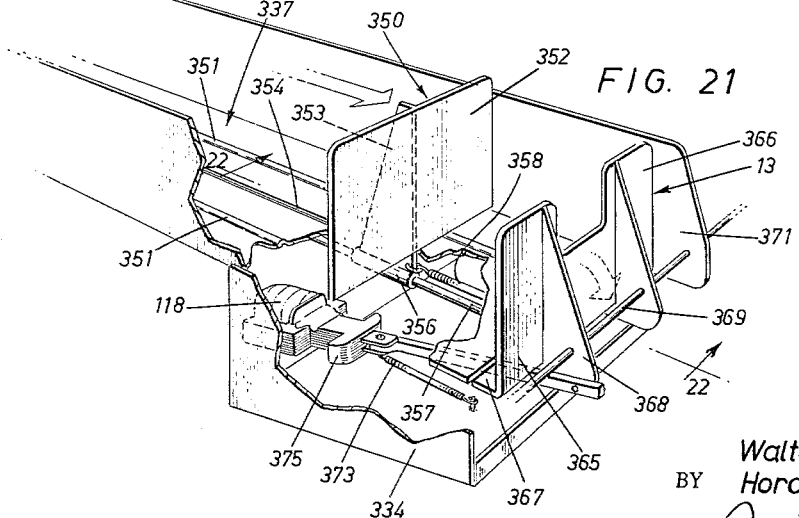

March 1, 1966 W. G. GERHART ETAL 3,237,745
VENDING MACHINE
Filed June 7, 1963 20 Sheets-Sheet 15

INVENTOR.
Walter G. Gerhart
BY Horace H. Smee

AGENT

March 1, 1966 W. G. GERHART ETAL 3,237,745
VENDING MACHINE
Filed June 7, 1963 20 Sheets-Sheet 16

INVENTOR.
Walter G. Gerhart
BY Horace H. Smee

AGENT

INVENTOR.
Walter G. Gerhart
Horace H. Smee
BY
AGENT

March 1, 1966   W. G. GERHART ETAL   3,237,745
VENDING MACHINE
Filed June 7, 1963   20 Sheets-Sheet 18
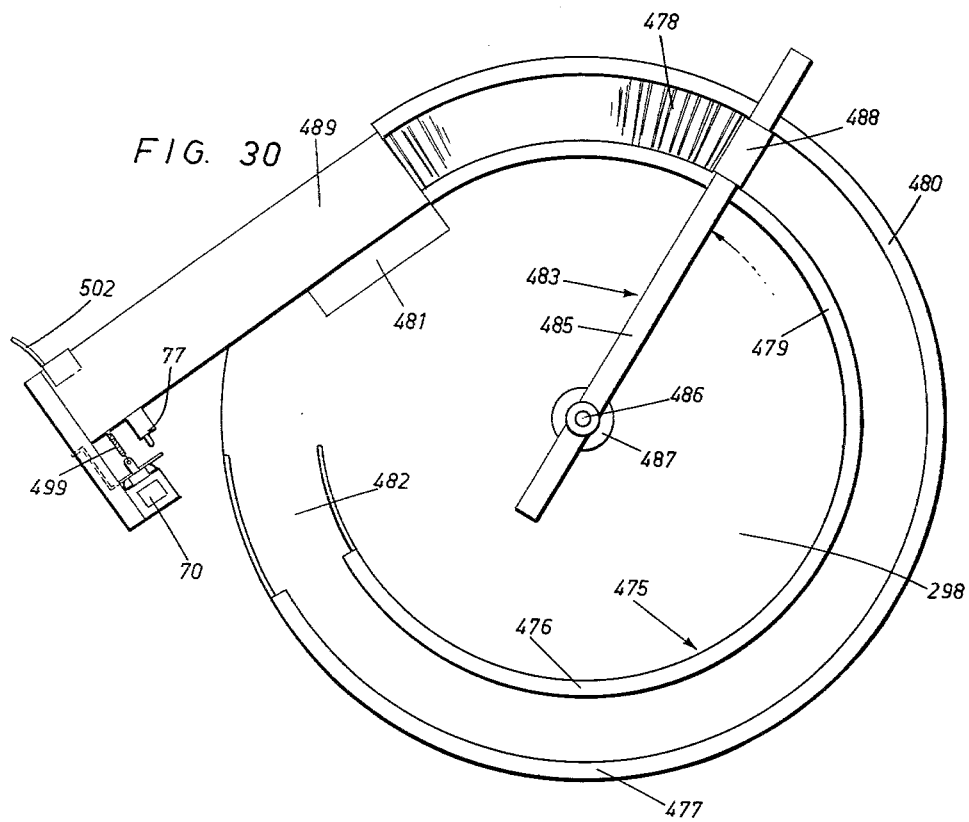
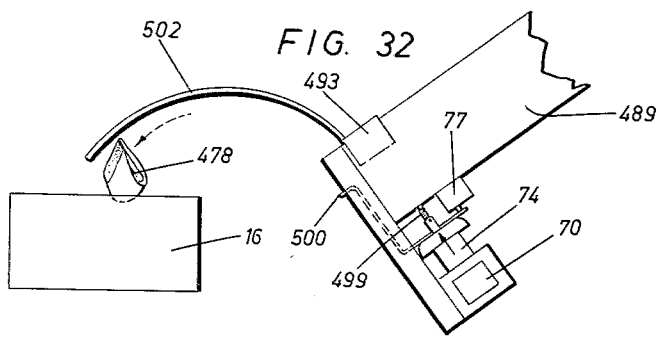
INVENTOR.
Walter G. Gerhart
BY  Horace H. Smee
AGENT INVENTOR.
Walter G. Gerhart
BY Horace H. Smee

AGENT

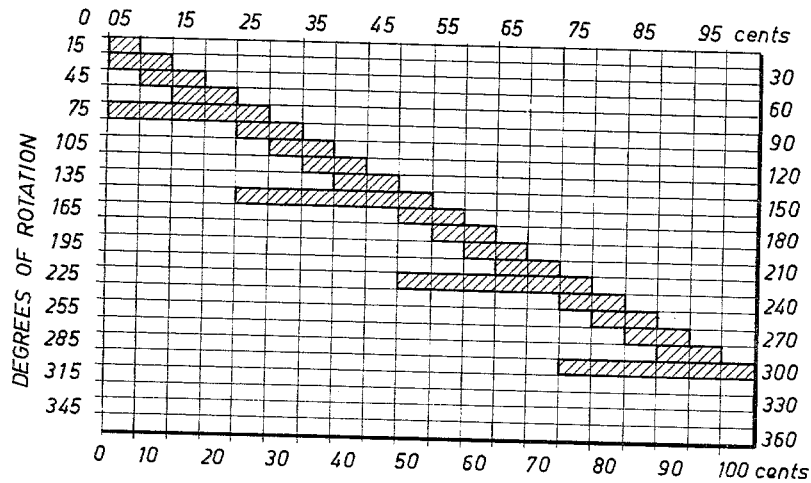
CHANGE MAKING POSITION  FIG. 35
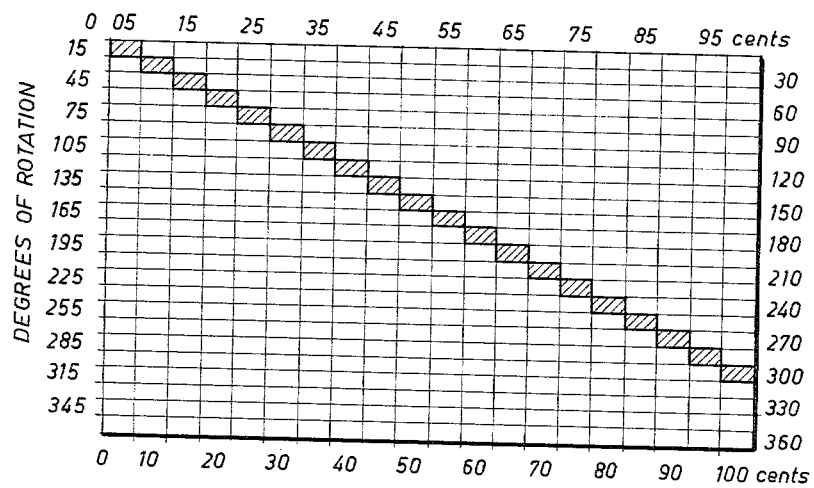
CORRECT CHANGE ONLY  FIG. 36
INVENTOR.
Walter G. Gerhart.
BY Horace H. Smee.
AGENT

United States Patent Office 3,237,745
Patented Mar. 1, 1966

3,237,745
VENDING MACHINE
Walter G. Gerhart and Horace H. Smee, Edmonton, Alberta, Canada, assignors to National Vending Research Ltd., Edmonton, Alberta, Canada, a company of Alberta, Canada
Filed June 7, 1963, Ser. No. 286,367
42 Claims. (Cl. 194—10)

This invention relates to vending machines. It is particularly directed to package vending machines of the electro-mechanical type which permit the automatic sale of articles of merchandise at any price while automatically providing the purchasers with correct change for over-deposit.

Heretofore, vending machines of the conventional type have suffered serious disadvantages which have acted to destroy the purchasing public's ready acceptance. For example, the conventional machines have a multiplicity of exposed slots, openings, levers and the like which render the operation of the machine overly complicated for the average person. Most machines cannot automatically compute and provide change and thus require coins of a certain denomination only for the actuation of the vending mechanism or require change to be incorporated in the package vended. Packages vended and/or coins returned are discharged from the machines at different locations in the machine front requiring the purchaser to stoop over and grope about for his package or change. The machines are limited structurally to certain sizes and shapes of packages vended thereby limiting the variety and price range of articles that can be sold.

Also, conventional vending machines have varied mechanical difficulties which have interfered with their positive, reliable and trouble-free operation. For example, most package bins normally are positioned vertically within the machine housing requiring discharge of the vended package by means of a common package ejector located at the base of the bins; the jamming of one package in a bin normally resulting in the whole machine being rendered inoperative. The vertical package storage columns interfere with the placement of the machine's mechanical components necessitating over-sized, bulky cabinets having considerable waste space. Also, conventional machines are complex in structure and operation requiring the constant care and attention of skilled servicemen to maintain each unit in operational condition. In addition, the removal and substitution of the machine mechanical and electrical component parts for servicing or replacement is difficult and time-consuming, especially in congested areas, resulting in high servicing costs, considerable shut-down time and inconvenience to the purchasing public.

It is, therefore, a principal object of the present invention to provide a vending machine which is aesthetic in appearance, compact in size and readily operable by the purchasing public.

It is another important object of the present invention to provide a vending machine which will dispense articles and return or provide change at a single delivery tray positioned in the machine face at a convenient height for the purchaser.

It is another object of the present invention to provide a vending machine which can vend packages and articles at a variety of price ranges while automatically providing the purchaser with correct change for over-deposit.

It is still another object of the present invention to provide a vending machine which can vend packages and articles of a wide variety of sizes.

Another object of the present invention is the provision of a vending machine having separable mechanical and/or electrical component parts which can be quickly and readily removed from the machine chassis for replacement and servicing.

Another object of the present invention is the provision of horizontal package or article trays which can be used in combination with an elevator system to vend said packages or articles at a height convenient to the customer while permitting an advantageous utilization of space within the cabinet, thereby providing a storage capacity heretofore not available.

And another object of the present invention is the provision of a lockout system, if desired, whereby the insertion of coins is prevented during the operational cycle of the machine, thereby obviating the possibility of coins being accepted within the machine without a credit to the purchaser.

These and other objects of the present invention, and the manner in which they can be attained will become apparent from the following detailed description, reference being had to the accompanying drawings, in which:

FIGURE 16 is a longitudinal vertical section taken through the accumulator drum illustrated in FIGURE 14;

FIGURE 17 is a transverse section taken through the accumulator drum along line 17—17 of FIGURE 16;

FIGURE 20 is a perspective view of two tiers of horizontal trays shown in their spaced relationship with an elevator embodiment;

FIGURE 21 is a perspective view, partly cut away, of a tray ejector mechanism;

FIGURE 30 is a plan view of the match storage and ejector mechanism in its entirety;

FIGURE 32 is a sectional view, in detail, illustrating the match ejector mechanism in operation;

FIGURES 35 and 36 are graphical presentations of the operation of the price-setting and control mechanism illustratetd in FIGURES 14, 16 and 17.

Like reference characters refer to like parts throughout the description and the drawings.

Figure 1:
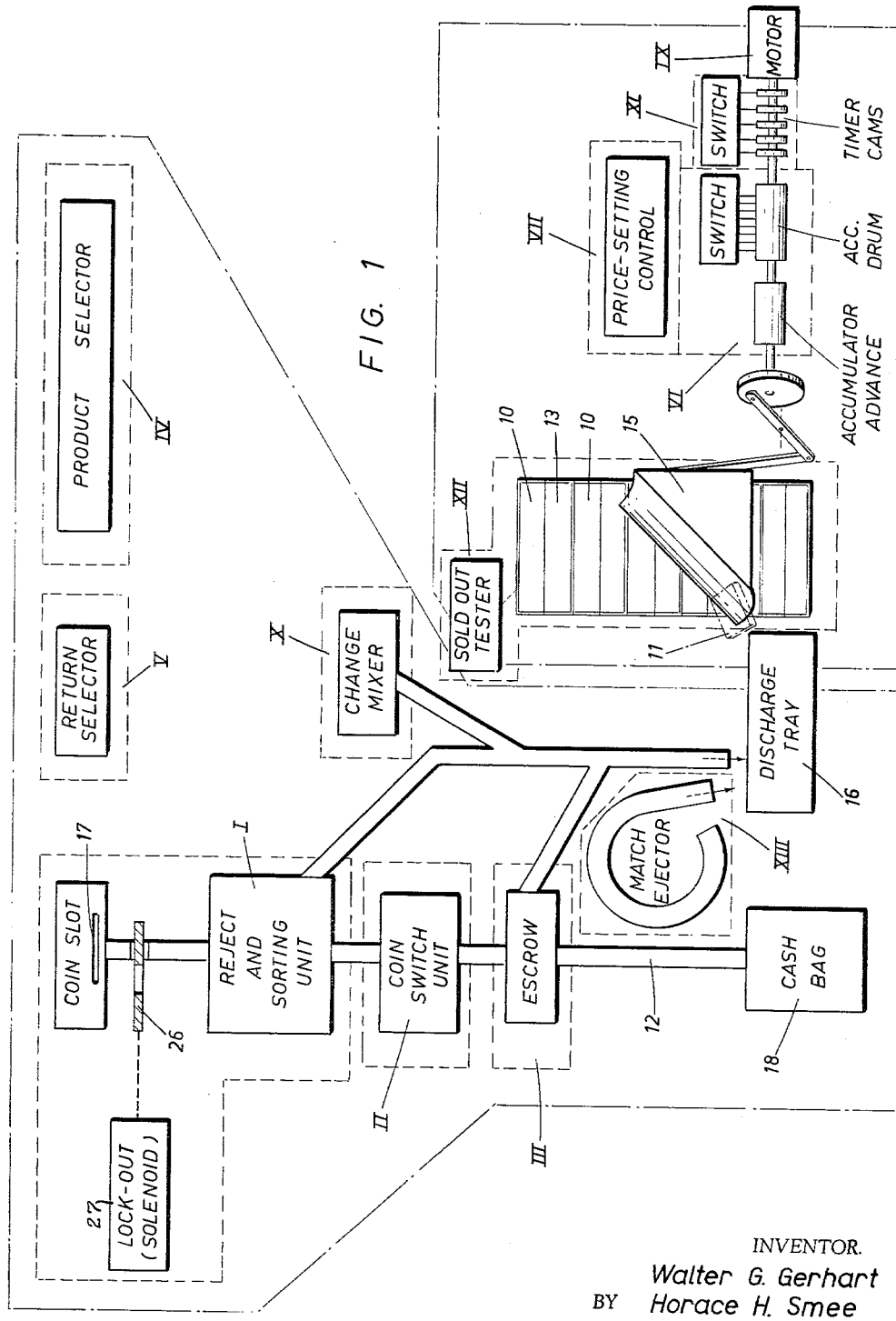
FIGURE 1 is a general schematic view of the vending machine according to the present invention showing the machine in its entirety.
Figure 2:
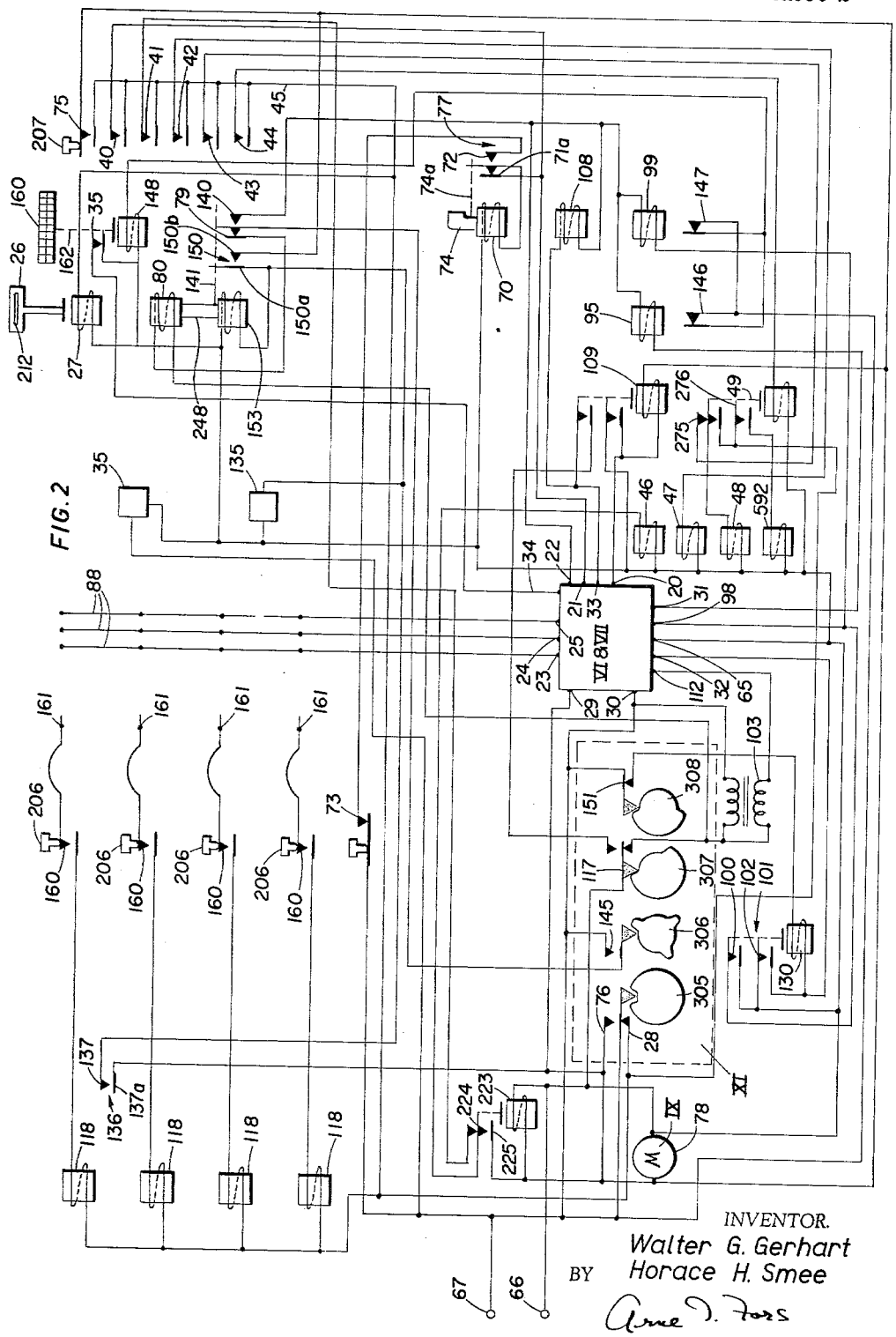
FIGURE 2 is an electric circuit diagram illustrating the electronic correlation of the components indicated generally in FIGURE 1.
Figure 3:
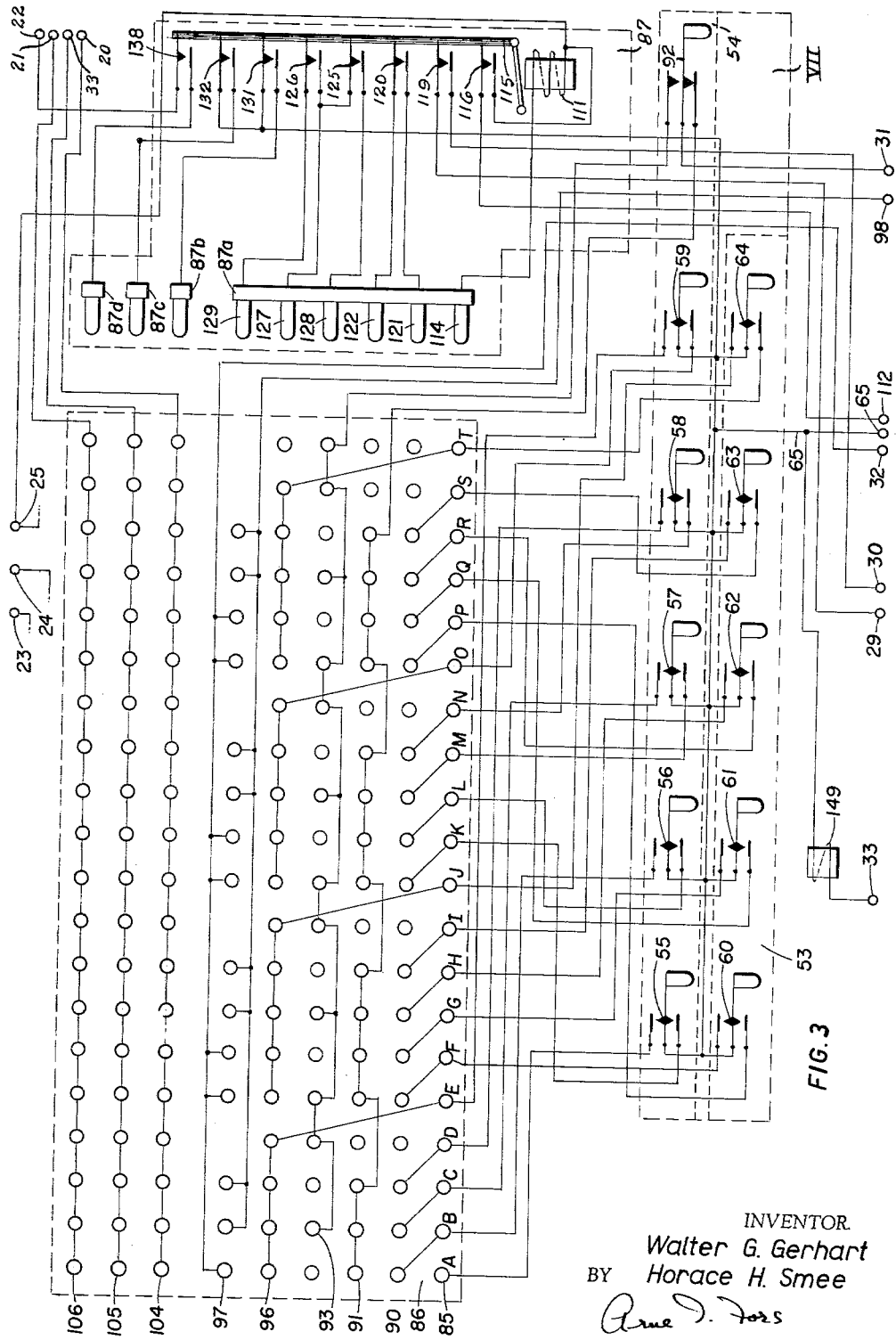
FIGURE 3 is an electric circuit diagram illustrating in substantial detail one embodiment of the counting and signal routing circuits indicated generally in FIGURE 1.
Figure 4:
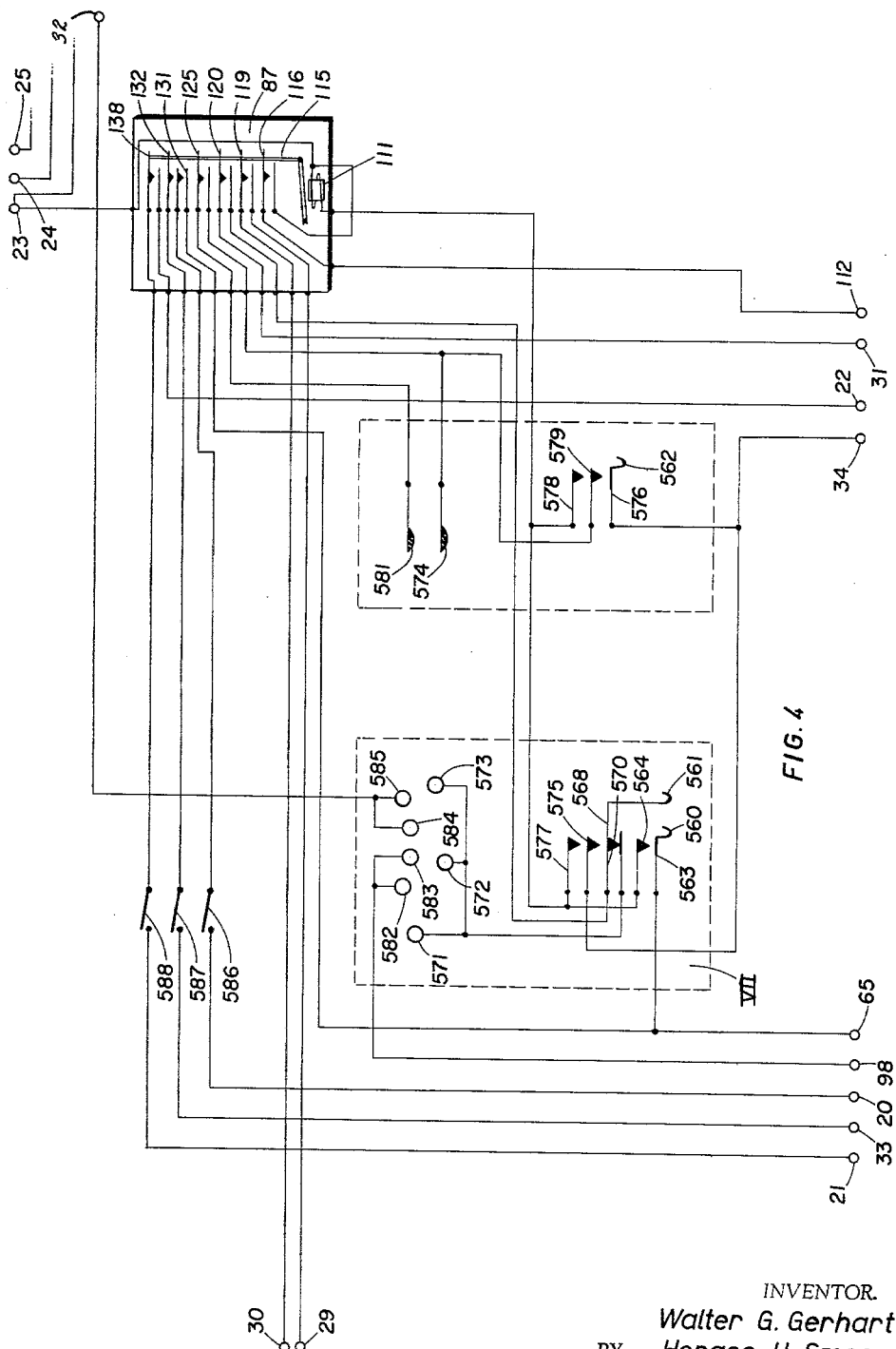
FIGURE 4 is an electric circuit diagram of another embodiment of a counting and signal routing circuit.

The following description of a preferred embodiment of the present invention, including components which are particularly suited for purposes of the invention but are not limited in use thereto, will first present an outline of the entire apparatus with reference to FIGURE 1; then provide a detailed description of the electronic devices and circuitry as depicted by FIGURES 2, 3 and 4; describe in detail the construction of the mechanical components as illustrated by FIGURES 5 through 34; and finally describe the operation of the vending machine as an integrated unit.

With reference to FIGURE 1, a plurality of horizontal package storing trays 10 arranged in tiers one above the other are each independently operable to eject a package 11 into a passageway by means of an ejector apparatus 13. The ejected package 11 drops by gravity onto an elevator 15 which, in reciprocating vertically within the passageway, raises the package to the level of the vending machine outlet tray 16 and there deposits said package in view and convenient access for the purchaser; the structure and operation of these devices being explained hereinbelow with particular reference to FIGURES 7 and 8 and FIGURES 19 through 26 inclusive.

The package handling components of the invention are operated by price-setting and timing control units which are integrated into the machine circuit as indicated schematically by FIGURES 2, 3 and 4. Coins of any denomination are inserted in a coin receiving slot 17 communicating with a reject and sorting unit I of conventional design, from which they pass into a coin controlled signal emitting unit II illustrated in FIGURES 9, 10 and 11. From there the coins pass by gravity into an escrow unit III described in detail hereinafter with reference to FIGURES 12 and 13. The escrow unit delivers the coins to either chute 12 leading to the cash receptacle 18 or discharge chute 19 leading to the machine outlet tray 16 upon energization of the escrow solenoids according to subsequent operation of the manually operable selector panel IV or the return selector button V.

The coin controlled signal emitting unit II activates the counter unit VI which presets the selector panel according to the accumulated value of coins deposited. The counter unit, co-acting with the price-setting control unit VII, credits the money paid in, and if the selector unit is actuated by pressing a manually operable selector button corresponding to an article selling at the price at or below the value of coins deposited and credited at the counter unit, activates the package ejector unit and sets up the price-setting control unit VII which routes control signals to the correct change or over-change mechanisms X and starts the cycling of the prime mover IX. The prime mover actuates the above mentioned elevator 15 and initiates the cycling of a plurality of timing switches XI to coordinate the functions of the machine components, as will be described in detail hereinbelow.

A sold out tester XII checks each tray at the instant of package ejection for actuating the escrow unit to return the deposited coins if the selected product is sold out. The escrow unit also returns coins paid in if it is desired not to complete the sale.

The match dispensing unit XIII can be selectively set up by the operator to dispense matches at the purchaser's option in place of one cent change, or independently for a one cent insertion.

The machine can be powered by standard power supply line voltage of 115 volts A.C. as illustrated, or by other voltages such as 24 or 12 volts A.C. or D.C. or combinations thereof as desired as will be evident to those skilled in the art.

*The electric circuit*

FIGURES 1 through 4 illustrate diagrammatically the electronic inter-relationship of the mechanical and electrical components of the present vending machine, the description of the mechanical components to follow hereinbelow.

The coin reject and sorting unit I is in communication with a coin receiving slot 17 mounted on upper front panel 203 as will be described hereinbelow with reference to FIGURE 5. Slot 17 is provided with a coin lock out detent 26 operatively connected to solenoid winding 27 which is energized in a coin receiving position by normally-closed double-throw switch 28 of the timing unit XI which opens when prime mover IX begins to cycle, thereby de-energizing winding 27. During the operational cycle of the machine and during intervals of power failures, the coin slot is thus closed to the insertion of coins.

The coin reject and sorting unit I comprises a conventional coin testing and routing device adapted to direct acceptable coins to the proper channels of the coin value signal emitting unit II disposed therebelow. In that unit I is a conventional type of a standard design, it will not be described herein. Unit II, shown in FIGURE 11 by way of illustration only, comprises, in essence, a plurality of coin-actuated switches 40 through 44 representing 1 cent, 5 cent, 10 cent, 25 cent and 50 cent values respectively. Each of the switches is connected in parallel with one side of a normally-closed switch 28 which is opened, as described hereinabove, when the prime mover commences its operational cycle. Each switch, with the exception of switch 40, is connected to its respective solenoid winding as indicated by numerals 46, 47, 48 and 49, for angularly advancing the accumulator units VI, illustrated structurally in FIGURES 14 through 18, an amount corresponding to the value of coins based on multiples of the lowest coin value.

For the purpose of illustration, the coin of base value is 5 cents representing an angular displacement of accumulator drum 50 of 15°. It will be understood that a base value of 5 cents is by way of illustration only and base values of 1 cent, 10 cents, and the like; or the use of tokens designating coin values, can be used equally satisfactorily by means of the present invention. It will be understood that the angle of 15° representing a base value is also by way of illustration only and other angles representing unit values can be employed as desired.

Figure 18:
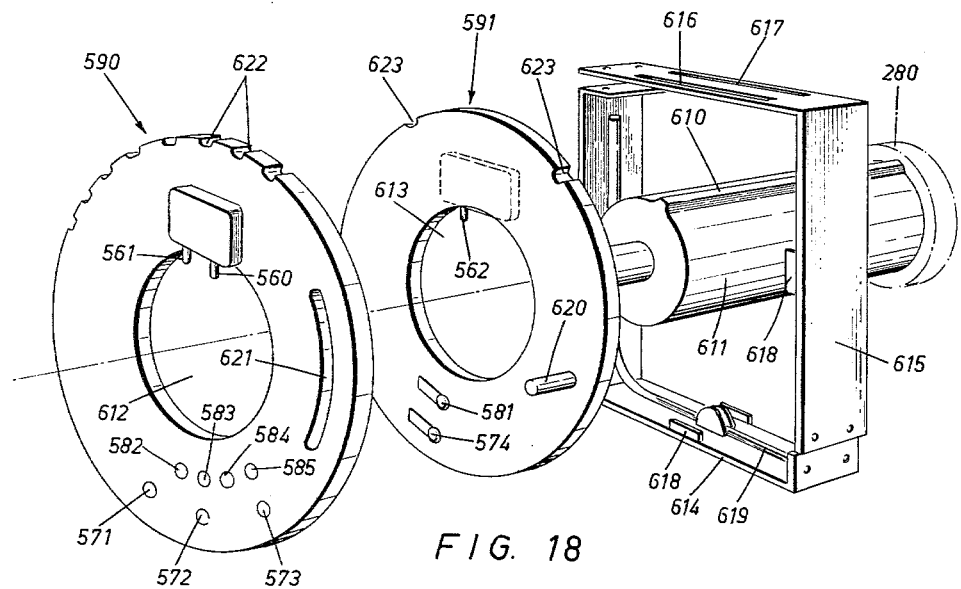
FIGURE 18 is an exploded perspective view of another embodiment of price-setting and control mechanism.

As drum 50 is rotatably advanced in accordance with the signals received from signal emitting unit II, the double-throw value switches of the group 55 through 64 or group of single-throw value switches 560 through 562 of unit VII are selectively closed, as described with reference to FIGURES 14 and 18 respectively and the graph according to FIGURE 35 permitting selection of packaged goods at or below the credit value as will be described hereinbelow with reference to the operation of the machine.

The penny switch 40 emits an electrical impulse to solenoid winding 70 opening contact 71 and closing contact 72 of switch 77 such that winding 70 is thereafter energized until match selector switch 73 is manually actuated to its open position. Upon the opening of switch 73 to de-energize solenoid winding 70, core armature 74 of said solenoid is returned to its at-rest position by a spring bias illustrated in FIGURES 15 through 17 thereby ejecting a pack of matches, as will be described hereinbelow with reference to FIGURES 30 to 32.

Independently operable coin return switch 75 electrically connected to the motor 78 of prime mover unit IX, is capable of initiating the cycling of said motor, thereby opening lower switch 28 and closing upper switch 76 of the group of switches identified by numeral XI for continuing the energization of the motor through a complete cycle. Concurrent with the energization of motor 78 is the energization of solenoid 223 connected in parallel thereto wherein the the drawing down of contact 224 into abutment with lower terminal 225 closes the circuit to solenoid 46. Solenoid 46 is thus energized and retracts link 267 which pivots lever 268 away from the accumulator drum 50, thereby freeing said drum for rotational movement, as will be described hereinbelow with reference to FIGURES 14 and 15. The closing of normally open switch 145, routed via normally closed contact 79, energizes reject solenoid winding 80 to open base member 81 of escrow unit III as described in detail hereinbelow with reference to FIGURES 12 and 13, thereby returning coins in the escrow unit to chute 19 and the discharge outlet tray 16. The reject solenoid winding 80 is connected to power supply lead 66 by cam-switch 117.

Figure 14:
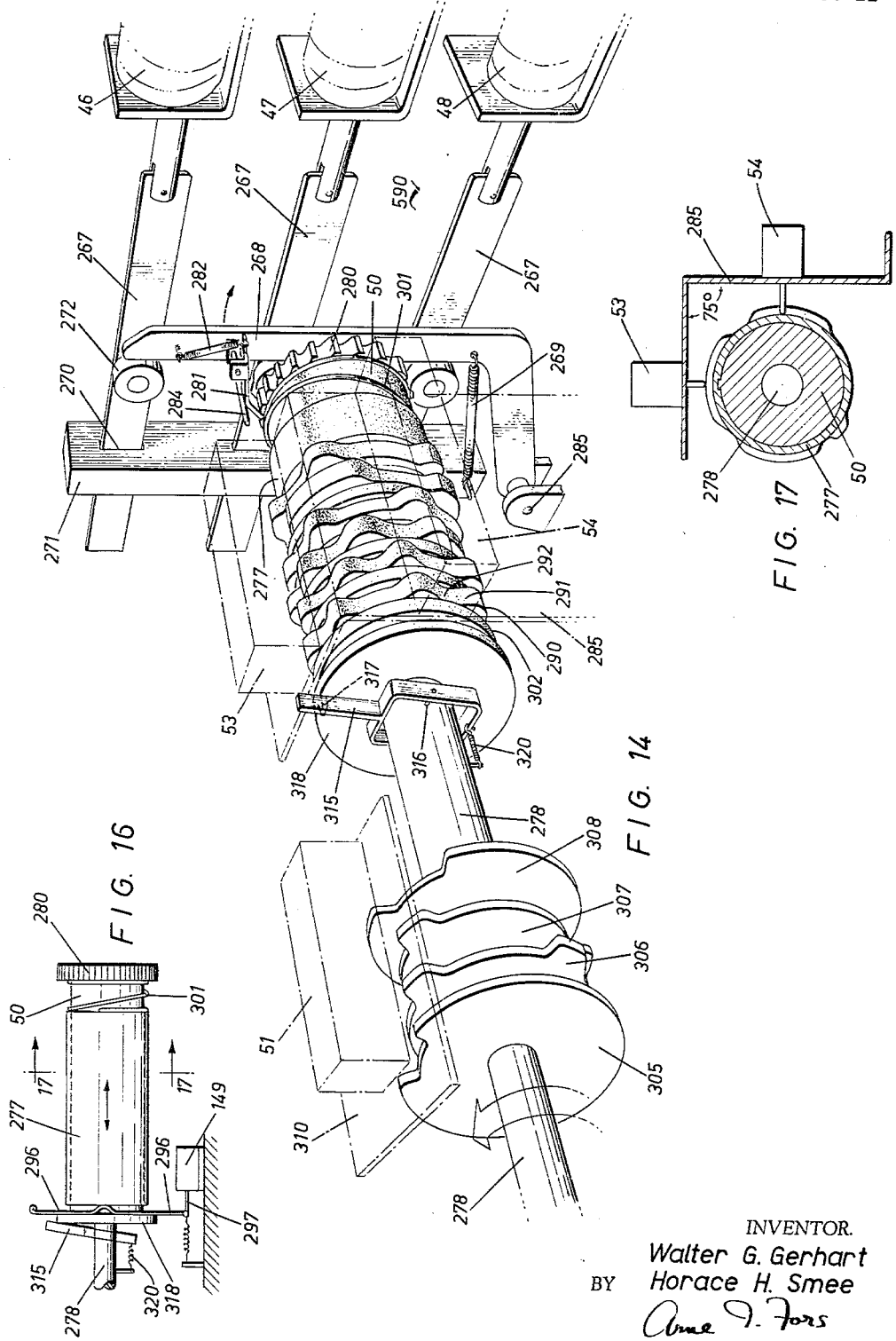
FIGURE 14 is a perspective view of an embodiment of the price-setting control mechanism and the accumulator drum advance mechanism of the present invention.

With reference now to the embodiment of price-setting control and accumulator drum illustrated electrically by FIGURE 3 and structurally by FIGURES 14, 16 and 17, the advance of accumulator drum 50 closes at least one value indicating double-throw single-pole switch of the groups of switches 55 to 59 and 60 to 64 inclusive, identified by numerals 53 and 54, which total a credit according to the switch or switches closed. Each switch pole is connected in parallel by line 65 to one side 66 of the power supply. The opposing switch contacts are connected to a row of corresponding terminals 85 of a bridge block 86. At least one bridge circuit relay 87 adapted in this application to be inserted in bridge block 86 by a group of linearly aligned terminals 87a and independent terminals 87b, 87c and 87d, and in communication with a corresponding terminal strip 88, establishes the price level governing the selection of packages.

Bridge block 86 comprises a plurality of terminal sockets arranged in 9 longitudinal and 20 transverse rows interconnected as illustrated by FIGURE 3.

A row of terminals 85, each identified by letters A through T respectively, correspond directly to price increments based on multiples of the base value; a 5 cent value in the present illustration. A second row of terminals 90 is connected to row of terminals 85, with the exception of terminals 90–D, 90–I, 90–N and 90–S, such that each terminal in row 90 is connected to a terminal of row 85 of next increasing value. In the third longitudinal row of terminals 91, each terminal is linearly inter-connected, with the exception of terminals 91–D, 91–I, 91–N, 91–S and 91–T and communicated with lower contact of switch 92 for purposes which will be explained as the description proceeds. In longitudinal row 93, all the terminals are linearly interconnected except terminals 93–A, 93–C, 93–F, 93–H, 93–K, 93–M, 93–P and 93–R and communicated to the upper contact of switch 92 which is engageable by the movable contact of switch 92 connected to the 5 cent change actuator solenoid 95 by line 31.

In row 96, terminals 96–A to 96–D inclusive are inter-connected and in communication with terminal 85–E, terminals 96–E to 96–I inclusive are inter-connected and in communication with terminal 85–J. In like manner, terminals 96–J to 96–N inclusive are connected to terminal 85–O and terminals 96–O to 96–S inclusive are connected to terminal 85–T.

In row 97, terminals 97–B, 97–C, 97–G, 97–H, 97–L, 97–M, 97–Q and 97–R are connected to the dime changer 99 by line 98 and to normally open contact 100 of relay 101. Terminals 97–A, 97–E, 97–F, 97–J, 97–K, 97–O and 97–P are connected with the winding of relay 101 and to contact 102 which is connected to one side of the power supply for energizing said relay winding.

The terminals of each row of terminals 104, 105 and 106 are linearly inter-connected and are communicated to components as follows: row 104 is connected to the 2 cent relay solenoid winding 109 by line 20, row 105 is connected to the 1 cent changer solenoid winding 108 by line 33 and row 106 is connected to normally closed switch 71 of the match ejector for energizing solenoid winding 70 by line 21, thereby retracting core 74 to open switch 71 and close switch 72 for maintaining winding 70 energized until switch 73 is actuated, for selection of a pack of matches, to break the circuit. Line 22 interconnects relay switch 138 to normally open contact 140 of the escrow unit.

In the present embodiment, bridge relay 87 has a set of aligned terminals 87a and independent terminals 87b, 87c and 87d connected thereto adapted to be inserted into one of the rows A through T of bridge block 86. Bridge relay 87 comprises a single winding relay 111 which is connected to terminal 114 which in turn is adapted to be inserted in one of the terminal sockets of row 85. Winding 111 is also connected to normally open relay controlled switch 116 which in turn is connected to holding transformer 103 by line 112 and to one side 67 of the power supply through cam-switch 117. Winding 111 is connected to a terminal strip such as strip 88 by one of lines 23, 24 and 25 for inter-connection with at least one of the vend solenoid windings 118.

Normally open relay controlled switch 119 acts as a motor start switch by closing the circuits 29 and 30 to the power supply and the winding of motor 78.

Normally open relay switch 120 is adapted to bridge row 90 and row 91 through terminals 121 and 122 to connect said rows to the 5 cent change actuator 95 by line 31.

The normally open switches 125 and 126 are connected on one side in parallel to terminal 127 which is adapted to be inserted in row 96. The opposite contact of switch 125 is connected to terminal 128 which is adapted to be inserted in row 93 which is also connected to the 5 cent changer. The opposite terminal of switch 126 is connected to terminal 129 for insertion into row 97 which, in turn, is connected to the solenoid winding 130 of 20 cent relay 101 by line 32 or the solenoid winding of the 10 cent changer solenoid 99 by line 98.

Switches 131 and 132 are connected in parallel to line 65 which is communicated with one side 66 of the power supply. The opposite contact of switch 131 is connected to terminal 87b for insertion in row 104. The opposite contact of switch 132 is connected to terminal 87c for insertion into row 105.

One contact of switch 138 is connected to terminal 87d which is adapted to be inserted in row 106. The opposite contact of switch 138 is connected by line 22 to normally open contact 140 of the accept relay 141 which is connected in parallel to the one penny changer, 5 cent changer and 10 cent changer and which also functions as the escrow accept solenoid.

The second embodiment of price-setting control and accumulator drum value stepping switch arrangement, illustrated electrically in FIGURE 4 and described structurally hereinbelow with reference to FIGURE 18, comprises at least three value switches 560, 561 and 562, one of which is adapted to be actuated at one time by means rotatably carried by the accumulator drum 50. Switch 560 is a single-pole, single-throw type having one contact 563 connected by line 65 to power supply 66. Contact 563 is in operable engagement with drum 50 such that switch 560 is normally open and is closed only when the accumulater drum 50 has been rotatably advanced an amount equal to the value of the article to be vended. Contact 564 is in communication with winding 111 of relay 87. In that the price-setting controls and stepping switches illustrated in FIGURES 3 and 4 are in communication with a substantially similar relay device 87 and are connected to the machine electrical components illustrated schematically in FIGURE 2 by common lead wires, the like parts in the two embodiments are given like reference numerals to facilitate and clarify the description and operation of the circuitry. Switch assembly 561 consists of a single-break double-make type switch wherein contact 568 is operably connected to drum 50 for actuation thereby. Contact 568 is connected to the 5 cent changer by way of line 31 via relay contact 120. Lower contact 570 is connected, in series, to three slide contacts 571, 572 and 573, one of which is adapted to be abutted by a slide contact 574. Middle contact 575 is in parallel with contact 576 of switch 562 which is, in turn, connected by line 34 to correct change solenoid 148. Top contact 577 is directly connected to relay winding 111 in parallel with top contact 578 of switch 562. Centre contact 579 of switch 562 is connected, in parallel, with sliding contact 574 and relay contact 125 which are connectable to sliding contact 581.

Sliding contacts 582 and 583 are connected to the 10 cent changer solenoid 99 by line 98. Contacts 584 and 585 are connected to the 20 cent relay 130 by line 32.

Switches 560 and 561 and slide contacts 571, 572 and 573 and 582 to 858 inclusive are mounted on disc 590, and switch 562 and slide contacts 574 and 581 are mounted on disc 591, such that one of contacts 571, 572 and 573 can be engaged with contact 574 and one of contacts 582 to 585 can be engaged, if desired, with contact 581, as will be described hereinbelow with reference to the operation of this embodiment.

Switches 586, 587 and 588 can be selectively closed to provide a pack of matches, 1 cent or 2 cents change respectively, or combinations thereof, as desired. The price-setting circuit described in FIGURE 4 differs from that described in FIGURE 3 in that the former permits mechanical price and change settings at actual article values, 5 cents overages and 25 cent multiples whereas the latter permits electrical price and change selections at actual article values and automatically sets up 5 cent overages and 25 cent multiples.

With reference now to FIGURE 2, contact 79 of relay 141 is connected to cam operated switch 145 which in turn is communicated with power supply 67. Functioning in conjunction with change actuator solenoids 95 and 99 respectively, are switches 146 and 147, the physical location of switch 146 being illustrated in FIGURE 27 for closing the circuit to solenoid 148. Solenoid 148 is adapted to open switch 35 to de-energize correct change solenoid 149 in the accumulator embodiment illustrated in FIGURES 14, 16 and 17 and to open the circuit to line 34 in the circuit illustrated in FIGURE 4.

Contact 150a of relay-actuated normally open switch 150 is connected in parallel to cam operated normally open switch 76. Contact 150b is connected in parallel with solenoid winding 153 and package counter 135 which in turn are connected to lead 66 of the power supply and to contact 137 of normally-open switch 136 which is adapted to function as a sold-out tester. Contact 137a is connected to lead 67 of the power supply through switch 76.

Each of the package ejector solenoid windings 118, which are connected in parallel via cam operated normally closed switch 28 to lead 67 of the power supply is connected to a manually operable normally open switch 160. Switches 160 are connected to a terminal 161 which can be selectively inserted in one of the terminal socket strips 88 which are, in turn, connected to the accumulator switches by the circuits illustrated in FIGURES 3 and 4.

Illuminating means 35 shown connected to the power supply leads 66 and 67 are located in upper panel 203 to illuminate the selectors 206 and the other control devices.

The mechanical components

The following detailed description relates to the structure and function of the mechanical components integrated with the electrical circuitry as has been described hereinabove.

Figure 5:
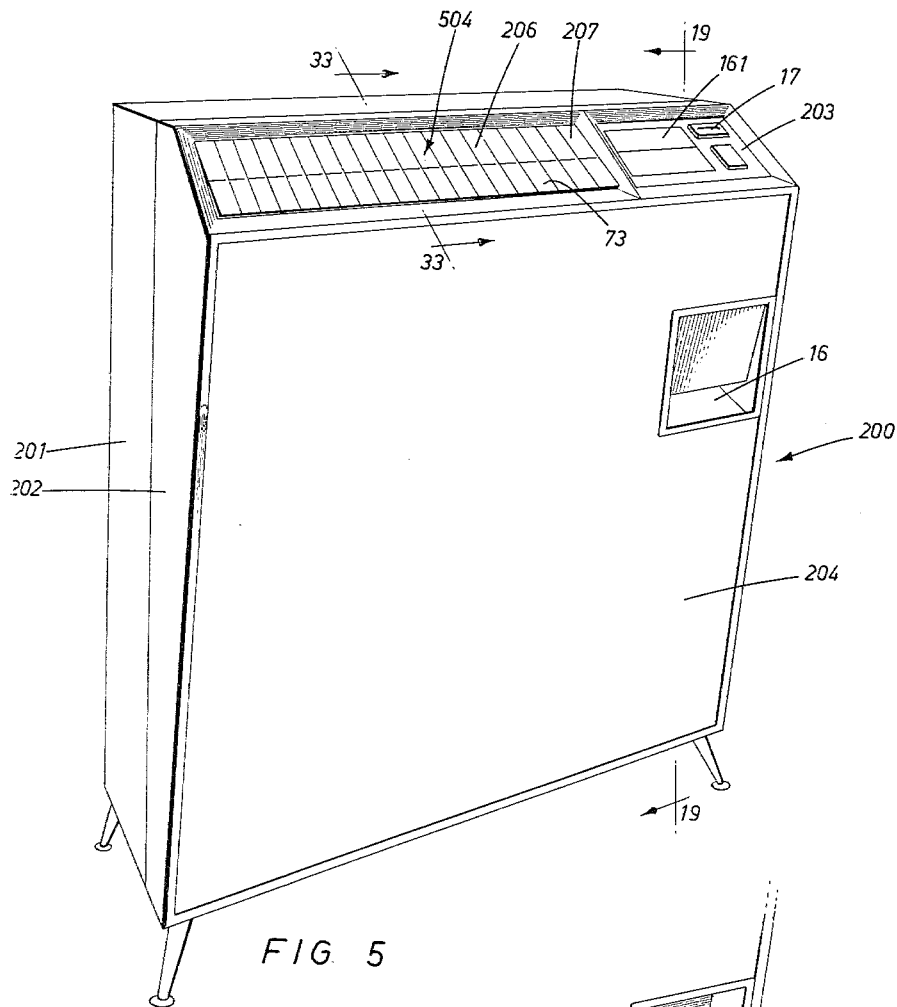
FIGURE 5 is a perspective view of a preferred embodiment of vending machine casing according to the present invention.
Figure 7:
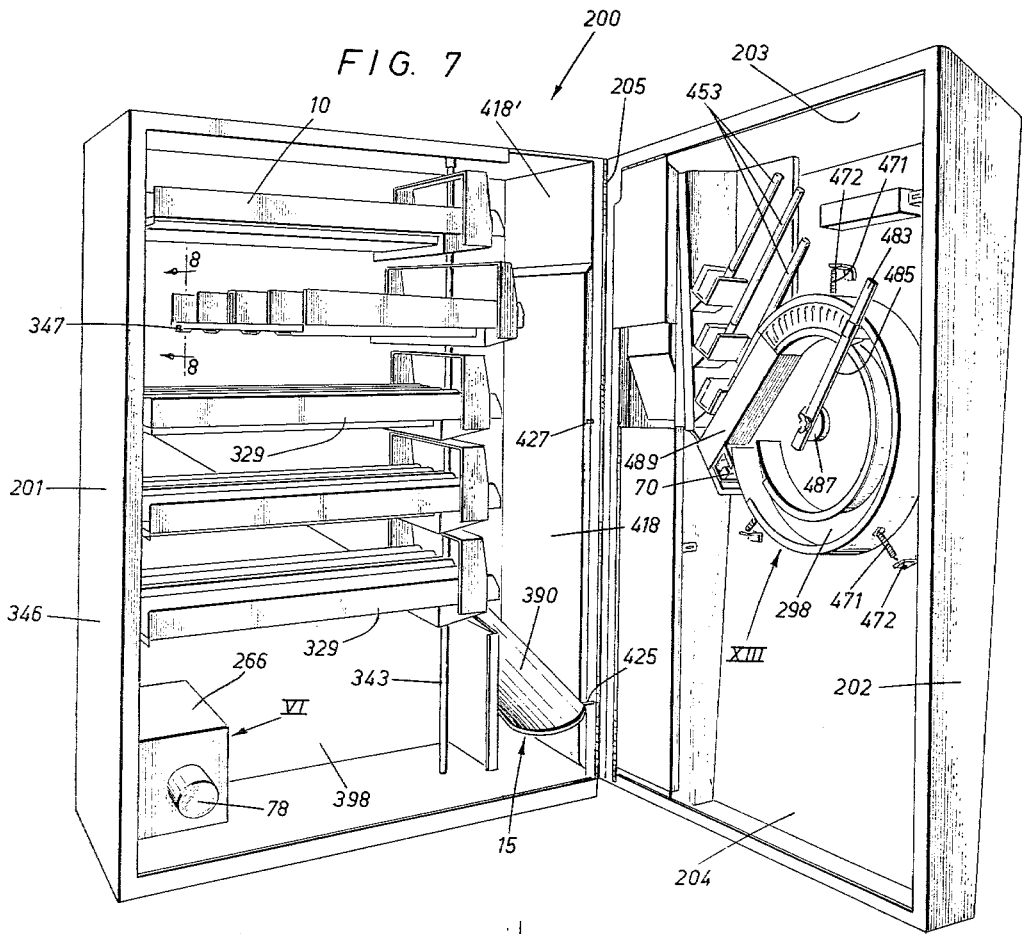
FIGURE 7 is a perspective view of the present vending machine having the front panel in an open position to illustrate the general physical inter-relation of component parts.

The vending machine casing indicated generally by the numeral 200 as illustrated in FIGURES 5 and 7 comprises a rigid rear portion 201 of generally rectangular prismatic configuration formed from sheet metal adapted to house therein horizontal article trays 10, elevator 15 and the control unit VI having price-setting and sequence control units. A front casing portion 202 likewise formed from sheet metal and having an upper panel 203 and a lower panel 204 forming a right triangular prism is pivotally mounted on rear casing 201 by a hinge 205. Upper front panel 203 is adapted to carry selector units 206 which will be further described with reference to FIGURES 33 and 34 and illuminating means 35 shown in FIGURE 2. Panel 203 also supports, in exposed positions, coin slot 17, reject selector 207 and "Correct Change Only" indicator 160 adapted to be positioned in window 161 by armature 162 upon energization of solenoid 148.

Lower front panel 204 carries delivery tray 16 which is in communication with the package delivery system, coin reject and coin change-making mechanisms and match dispensing mechanism, whose structural constructions and functions will be described hereinbelow. The front casing portion 202 houses on its interior side units I to III inclusive, change maker unit X and the match dispenser unit XIII.

Figure 9:
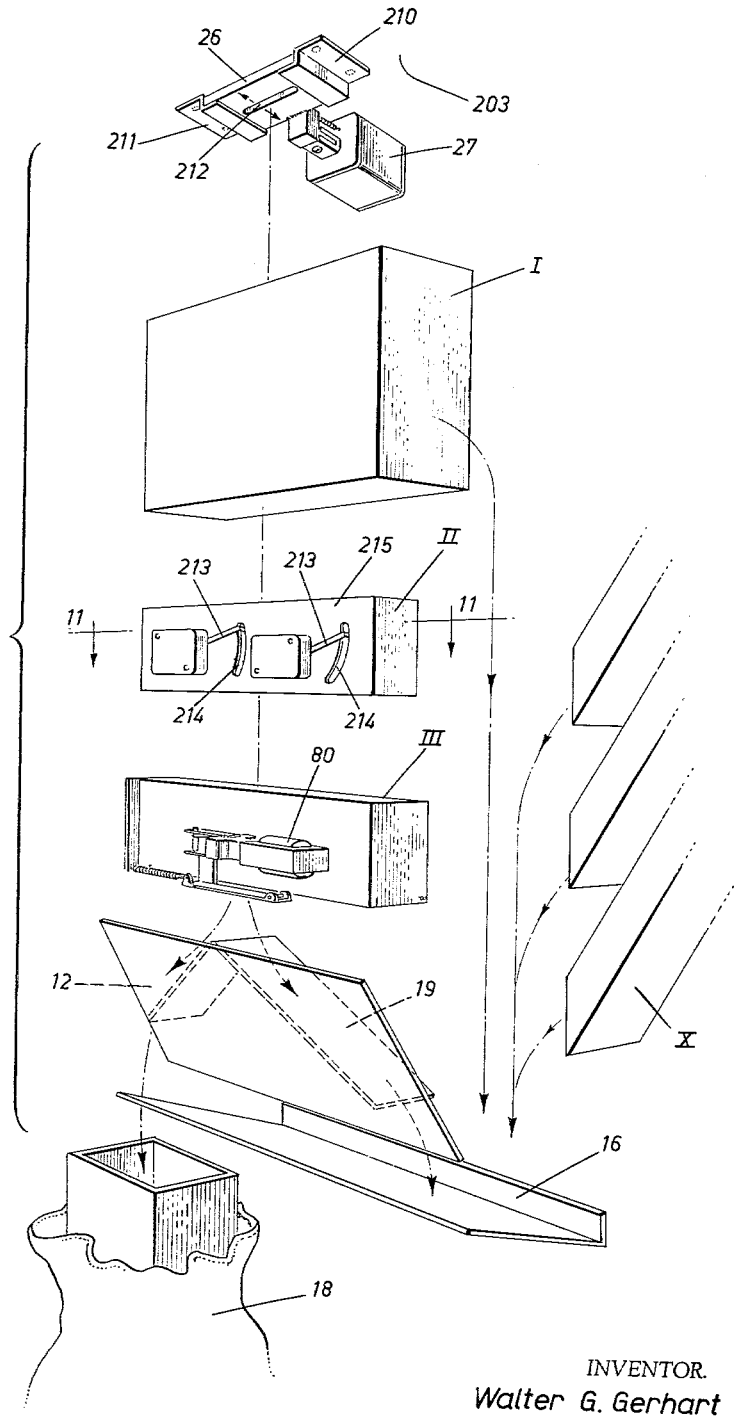
FIGURE 9 is a perspective view of the coin receiving, counting, storing and routing components of the present invention.
Figure 10:
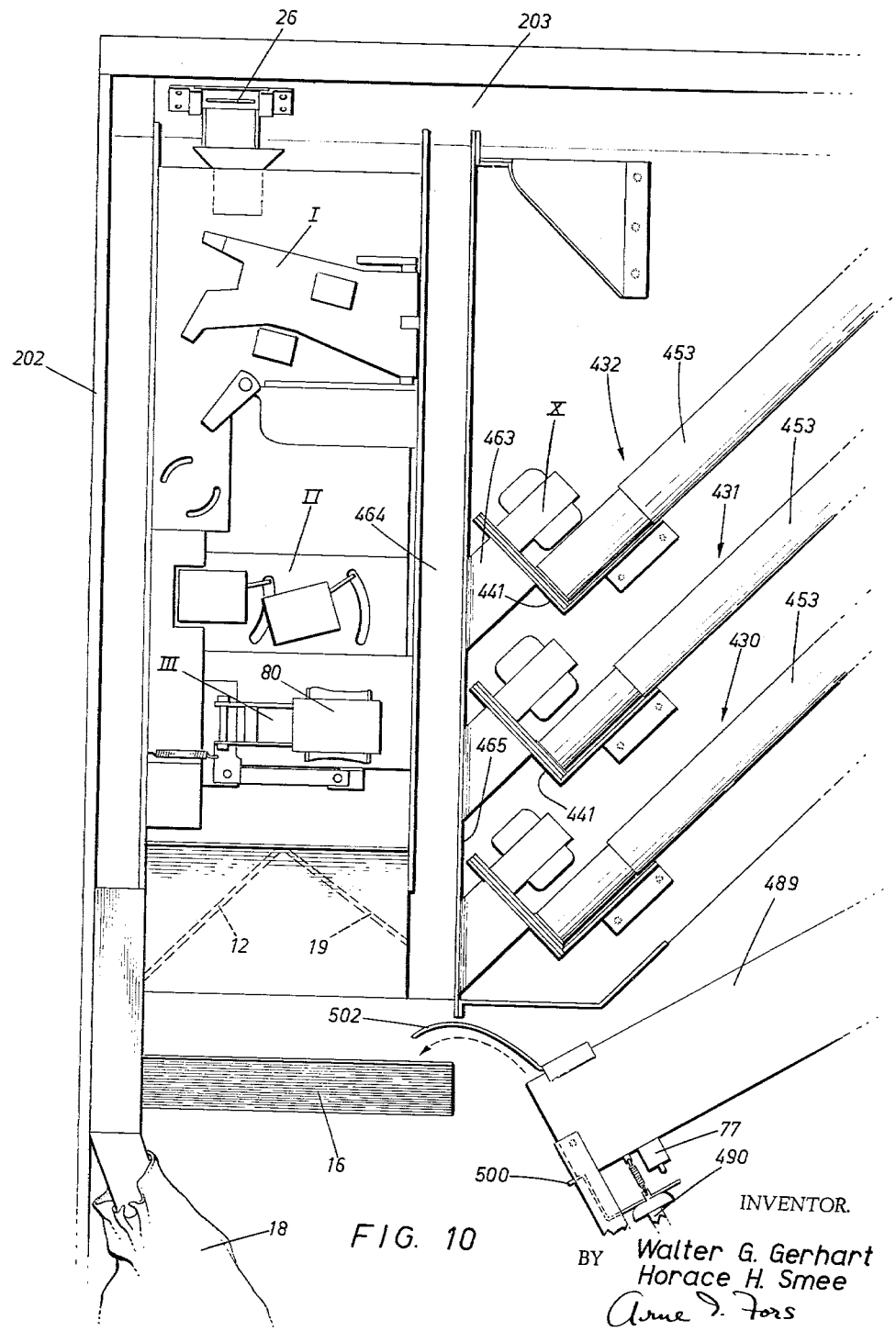
FIGURE 10 is a side elevation, in more detail, of the components illustrated in FIGURE 9.

With reference to FIGURES 9 and 10, detent 26 of the coin lock-out mechanism, which has been described hereinabove with reference to FIGURES 1 and 2, is slidably mounted within flanges 210 and 211 which are secured to the underside of upper panel 203. Slot 212 formed in detent 26 is adapted to be aligned with coin-receiving slot 17 while the solenoid winding 27 is energized; thus preventing the insertion of coins into the machine during an operational cycle or during a power failure. With the use of conventional reject mechanisms in unit I, it may be preferred, of course, to delete coin-lockout device 26.

Coin reject and sorting unit I is of a conventional design and accordingly will not be described herein. Coin value signal emitting unit II, illustrated with reference to FIGURES 9, 10 and 11 comprises a plurality of coin-actuatable switches 40 to 44 inclusive each having a pivotally mounted finger 213 adapted to project through arcuate openings 214 formed in side walls 215, 216 and 217 into passageways 218–222 defined therebetween for actuation by 1 cent, 5 cent, 10 cent, 25 cent and 50 cent coins respectively.

The escrow unit III, illustrated with reference to FIGURES 2, 9, 12 and 13 is secured to front panel 203 below signal emitting unit II such that it will receive and retain coins discharged therefrom. The escrow unit comprises parallel side walls 240 and 241 held a predetermined distance apart by inwardly inclined end walls 242 and 243. A bottom closure plate or gate 81 is pivotally mounted at each end by hinge pins 246 and 247 to permit tilting of said plate into one of the two positions indicated by numerals 245 and 245' in FIGURE 12. Solenoid 80 mounted on side wall 240 is pivotally connected by core armature 244 to arm 249 which is formed integrally with a base member 250 co-extensive with plate 81. Member 250 is pivotally mounted at one end on side wall 240 by pin 251 which extends therefrom and which is substantially coaxial with hinge pin 246 when the bottom closure plate 81 is in its closed position. Member 250 is pivotally mounted at its other end by hinge pin 247 which extends below side wall 240. A tension spring 255 connected at one end to the upper part of arm 249 and connected at the opposite end to flanged portion 256 of side wall 240 biases arm 249 outwardly at its upper end to return plate 81 to its normally at-rest closed position.

In like manner, solenoid 153 mounted on wall 241 of the escrow unit is pivotally connected by core armature 248 to arm 257 which is formed integrally with base member 258. Member 258 is pivotally mounted at one end on side wall 241 by pin 259 which is rigidly secured thereto in coaxial alignment with hinge pin 247 and pivotally mounted at its opposite end by hinge pin 246 which extends below side wall 241. A tension spring 261 connected to the upper portion of arm 257 and to wall flange 262 biases plate 81 in an upwardly closed position.

Figure 12:
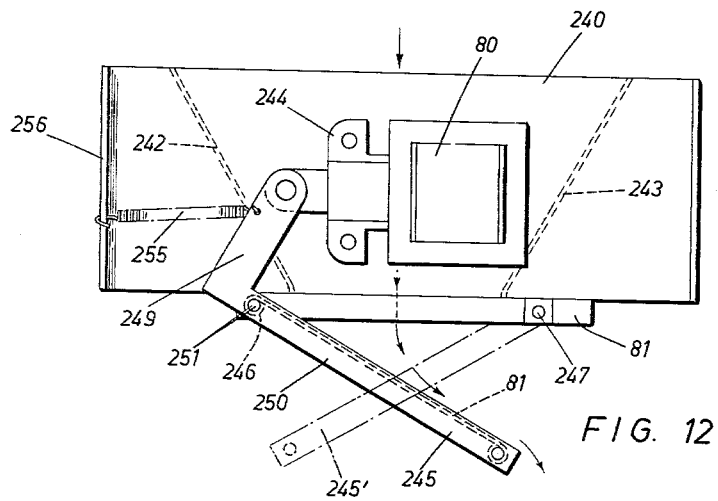
FIGURE 12 is a side elevation of the escrow unit according to the present invention illustrating its two operational positions.

As illustrated in detail in FIGURE 12 and generally in FIGURE 9, upon reject solenoid 80 being energized, arm 249 and member 250 are pivoted in a clockwise direction about hinge pin 246 thereby pivoting plate 81 into the position designated by numeral 245 permitting coins contained in the escrow unit to slide from the plate into return chute 19 and discharge tray 16. In like manner, energization of solenoid 153 pivots plate 81 in a counterclockwise direction about hinge pin 247 into the position designated by numeral 245', thereby discharging the coins into chute 12 and coin bag 18. The solenoids 80 and 153, and their locations within the control circuit, have been described hereinabove in the description of the electrical circuit with reference to FIGURE 2.

Figure 13:
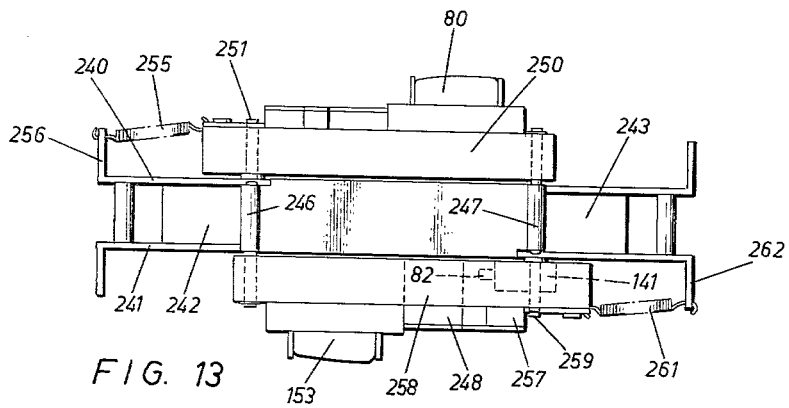
FIGURE 13 is a bottom view of the escrow unit illustrated in FIGURE 12.

A switch assembly 141 having an arm 82 is mounted on wall 241 as illustrated in FIGURE 13. The arm 82 is adapted to be engaged by core armature 248 as has been described hereinabove with reference to FIGURE 2.

Figure 15:
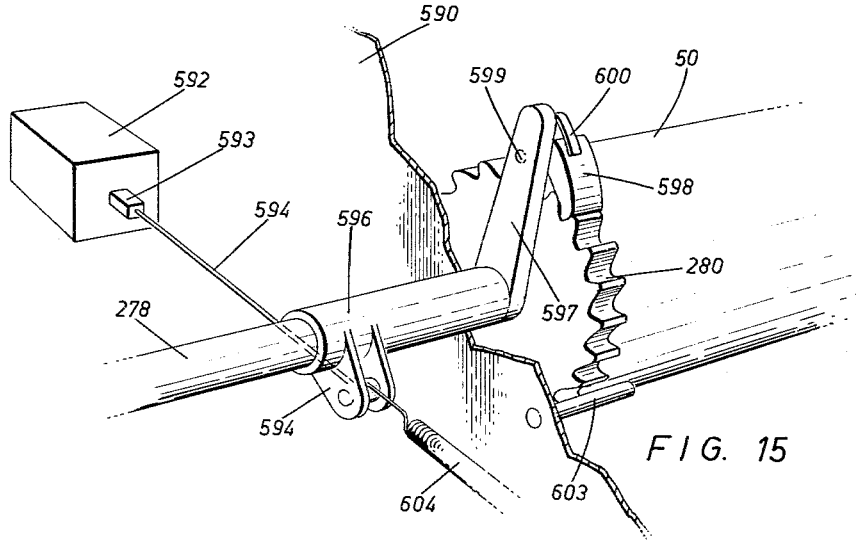
FIGURE 15 is a perspective view, partly cut away, of the drum advance mechanism illustrated in FIGURES 14 and 18.

The closing of switches 41 to 44 inclusive by the passage of coins through the coin passageways sends energy pulses to solenoids 46 to 48 and relay 49 respectively of the accumulator unit VI illustrated in detail in FIGURES 14 and 15. Solenoids 46 to 48 mounted one above the other on partition wall 590 are each operatively connected by links 267 to lever 268 which is normally biased in a substantially vertical "at-rest" position on its pivot connection 285 by tension spring 269. Each of links 267 is pivotally connected to its respective solenoid at one end and the opposite end slidably mounted in one vertically aligned openings 270 formed in post member 271. Each link has a nylon bearing 272 secured thereto intermediate its ends adapted to loosely abut lever 268 when in its at-rest position and to displace lever 268 in the direction of the arrow when actuated.

A ratchet wheel 280 secured to drum 50 is adapted to be engaged by pawl 281 which is carried by lever 268 and which is biased downwardly by tension spring 282 for positive engagement with the teeth of the wheel. An adjustable stop 284 mounted on wall 590 is adapted to abut and lock pawl 281 in the position illustrated against the teeth of wheel 280 such that drum 50 is locked from rotational movement until pawl 281 is retracted.

Each solenoid 46, 47 and 48 is adapted to linearly displace its respective link a distance which is a function of the value of its respective coin switch. For example, solenoid 46 representing a 5 cent coin value is adapted to displace link 267 linearly and lever 268 angularly in the direction of the arrow a distance sufficient to displace pawl 281 past one ratchet tooth; about 15° angular displacement of ratchet wheel 280. Therefore, as solenoid 46 receives an energy pulse from 5 cent switch 41, link 267 pulls lever 268 to the right as viewed in FIGURE 14 causing pawl 281 to step over one tooth of the ratchet wheel. As lever 268 is urged to return to its at-rest position by tension spring 269, pawl 281 engages the ratchet wheel turning sleeve 277 through about 15° of angular rotation. Stop 284 is adapted to co-act with pawl 281 to positively engage the ratchet wheel at the completion of advancement of the sleeve to prevent overstepping of the drum due to its inertia.

In like manner, the energization of solenoids 47 and 48 representing 10 cent and 25 cent values respectively advances their respective links 267 a distance proportional to the value represented by the solenoids. The 10 cent solenoid would therefore advance its connecting link and lever 268 such that pawl 281 is advanced through an angular displacement causing sleeve 277 to advance through about 30° upon lever 268 returning to its at-rest position. The 25 cent solenoid would likewise cause sleeve 277 to advance through about 75° of rotation.

A fourth solenoid 592 mounted on the opposite side of partition wall 590, has a core armature 593 pivotally connected to pitman 594 which is pivotally connected at its opposite end to crank 595 rigidly fixed to sleeve 596 rotatably mounted on shaft 278. A crank 597 rigidly connected to the opposite end of sleeve 596 pivotally carries a pawl 598 on stub shaft 599 fixed to said crank. One end of pawl 598 is biased downwardly by a tension spring 600 secured to the opposite upper end of the pawl and the upper end of crank 597 such that the pawl engages the teeth of ratchet wheel 280.

Upon the closing of 50 cent switch 44, a pluse is transmitted to relay 49 which, in closing switches 275 and 276, energizes solenoids 48 and 592 simultaneously such that lever 268 is retracted to unlock the ratchet wheel 280 and crank 597 advances said ratchet wheel through an angle of rotation of about 75° corresponding to a 25 cent credit. At the completion of its travel, pawl 598 of crank 597 abuts a stop 603 for positive engagement of the pawl with ratchet wheel 280 such that said ratchet wheel is locked from further rotation. Upon de-energization of relay 49 and solenoids 48 and 592, crank 597 is biased back to its at-rest position by tension spring 604 acting on pitman crank 595. Ratchet wheel 280 is thereby freed for continued rotational movement of about 75° by lever arm 268 as it is returned to its at-rest position. Thus, the drum 50 is advanced through a total of about 150° rotation in two steps upon the insertion of a 50 cent piece. The operation of the solenoids, relay 49 and the accumulator drum in relation to the electrical circuitry will be further described hereinbelow.

With reference now to FIGURES 14, 16 and 17, drum 50 is loosely rotatably mounted on shaft 278 and is adapted to support outer sleeve 277 which is slidably keyed thereon for axial movement as indicated by the arrow in FIGURE 16. Drum 50 is concentric with motor driven shaft 278 which is rotatably mounted within box 266 substantially at right angles to links 267.

Figure 27:
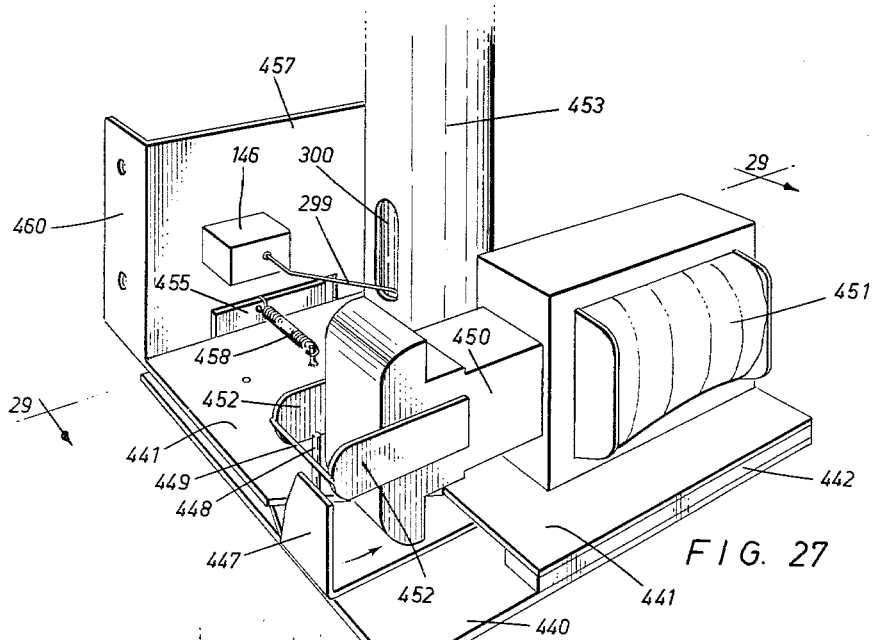
FIGURE 27 is a perspective view of the coin changer mechanism according to the present invention.

A switch box 54 containing single-pole switch 65 and single-pole double-throw switches 55 to 59 inclusive and switch box 53 containing single-pole double-throw switches 60 to 64 inclusive as indicated schematically in FIGURE 3, are mounted on support wall 285 as illustrated in FIGURES 14 and 15 such that the two boxes are angularly separated about 75° about the periphery of drum 50. Outer drum sleeve 277 has two sets of six equi-spaced circumferential races 290 and 302 formed thereon wherein each second race is adapted to co-act with at least one of switches 55 to 64 as will be described hereinbelow with reference to the operation of this accumulator embodiment. Each race 290 has a plurality of projections 291 and depressions 292 which selectively actuate the switches according to the angular displacement of the drum in the combination as illustrated graphically in FIGURE 35. In the event the change storing mechanisms are depleted, outer sleeve 277 is longitudinally displaced on drum 50 by the de-energization of solenoid 149 which is connected to pivotally mounted fork 296 by link 297 as illustrated in FIGURE 16. Solenoid 149 is de-energized by the opening of relay switch 35 which is held in an open position by the energization of relay coil 148. Relay coil 148 is energized by the presence of coins in the respective coin tubes which interact with arm 299 which extends through opening 300 formed in the tube wall 453, as illustrated in FIGURE 27, and which is operatively connected to coin tube switches 146 or 147. Upon the deenergization of solenoid 149, fork 296 is pivoted to the left in FIGURE 16 displacing sleeve 277 under the bias of coil compression spring 301 which is disposed about drum 50 at the opposite end of sleeve 277 between the edge of sleeve 277 and ratchet wheel 280.

By so longitudinally displacing sleeve 277, the races 302 adjacent races 290 are aligned with switches 55 to 64 providing actuation of switches corresponding to correct change only values, as indicated graphically by FIGURE 36.

Upon the energization of solenoid 149, link 297 urges fork 296 to pivot in a counter-clockwise direction as viewed in FIGURE 16 against compression spring 301 to displace outer sleeve 277 to the right whereby races 290 are re-aligned with switches 55 to 64 permitting price selection at a variety of prices, with a provision for change making, as illustrated graphically in FIGURE 35.

The second embodiment of the price setting and switching arrangement, as described hereinabove with reference to FIGURE 4, is illustrated structurally in FIGURE 18. A ridge 610, formed longitudinally on the periphery of drum 611, is adapted to engage switches 560, 561 and 562 which are mounted on the faces of discs 590 and 591. Central openings 612 and 613 formed in said discs are adapted to receive drum 611 concentrically therein for rotational movement.

Discs 590 and 591 are mounted for rotatable movement in brackets 614 and 615. A pair of slots 616 and 617 formed in the upper portion of bracket 615 and flanges 618 formed in the brackets 614 and 615 at 90° spacings about the peripheries of the discs are adapted to receive chords of each disc. A spacer 619 secured to bracket 614 maintains discs 590 and 591 in a predetermined spaced relation to each other.

A plurality of sliding contacts 571, 572 and 573 and 582 to 585 inclusive, spaced singly and in pairs at 15° intervals, as illustrated, are fixed to the inner face of disc 590 such that said contacts can be engaged by sliding contacts 574 and 581 fixed in radial alignment to the adjacent inner face of disc 591. A stop 620 fixed to the inner face of disc 591 is adapted to project into arcuate slot 621 formed in disc 590 such that the positioning of disc 590 relative to 591 can be limited to a maximum angular displacement of about 75°.

A plurality of indexing slots 622 are formed across the peripheral edge of disc 590 at 15° intervals. A plurality of indexing slots 623 are formed across the peripheral edge of disc 591 at 75° intervals. The operation of the price-setting discs and credit switches will be described hereinbelow.

With reference now to FIGURE 14, cam discs 305 to 308 are equidistantly mounted on motor shaft 278 for rotatable movement thereon. A switch box 51 secured to horizontal support plate 310 houses linearly aligned switches 28, 117, 145 and 151 above cams 305 to 308 as indicated schematically in FIGURE 2 to permit selective actuation of said switches for controlling the sequence of operation of the machine components.

Prime mover unit IX, indicated in FIGURE 7 by numeral 78, is rigidly mounted in one end of box 266 to provide a rotatable mounting for one end of shaft 278 coupled thereto. The opposite end of shaft 278 is journalled into the opposed end wall of box 266, not shown. Lever 315 pivotally mounted on shaft 278 by bearing pin 316, which extends through shaft 278 and is affixed to the arms of said lever, is adapted to engage detent 317 fixed to and projecting outwardly from disc 318 of drum 50 or 611. The upper portion of lever 315 is biased against the peripheral edge 319 of disc 318 by tension spring 320 secured at one end to the lowermost extension of lever 315 and at the other end to shaft 278 such that engagement of said lever with detent 317 is ensured for accurate resetting of the drum at zero credit when sleeve 277 has been angularly advanced.

Figure 8:
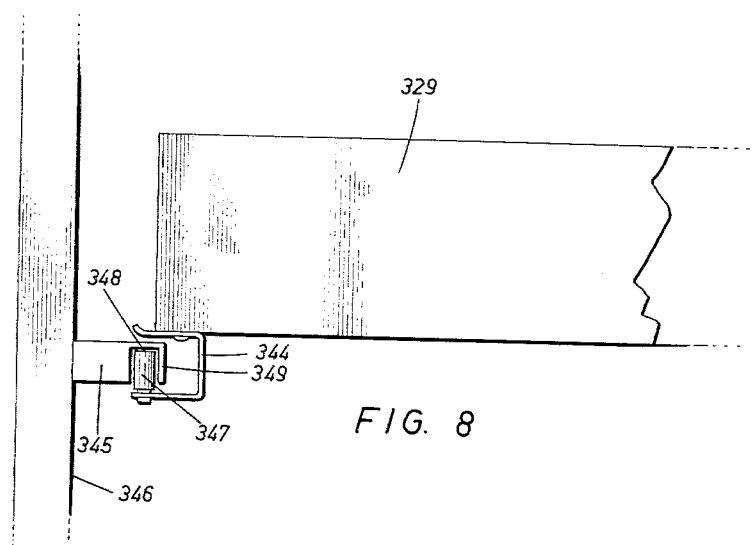
FIGURE 8 is a side elevation along the line 8—8 of FIGURE 7.

The horizontal package trays 10 and package ejectors 13 will now be described with reference to FIGURES 7, 8, 19 and 20 through 22 inclusive. The trays 10 preferably are arranged in tiers of four trays 329 each of which comprises a rigid frame 330 located at one end of said trays having side members 331 and 332, top member 333 and bottom member 334 as will be described in more detail hereinbelow. The tray walls 335 are held a predetermined distance apart throughout their lengths by floor member 337 to define four package containing channels 338 to 341 inclusive therebetween. The adjacent walls defining channels 339 and 340 are spaced apart to define a slot therebetween adapted to slidably receive bar 342 which is pivotally mounted on rod 343 which in turn is mounted vertically within casing 201. Each tier 329 of trays thus can be pivoted on rod 343 for loading of the trays or for removal of the tier of trays from the machine. The rear end of each tier of trays 329 is supported by a bracket 344 fixed across the underside of tier 329 which is adapted to bear on a bracket 345 fixed to the side wall 346 of the casing. A bearing pin 347 fixed to bracket 344 at one end thereof is adapted to travel within channel 348 formed by flange 349 of bracket 345 such that the rearward end of tier 329 is positioned a predetermined distance from wall 346 for vertical support on wall bracket 345 as illustrated in FIGURE 8.

Figure 22:
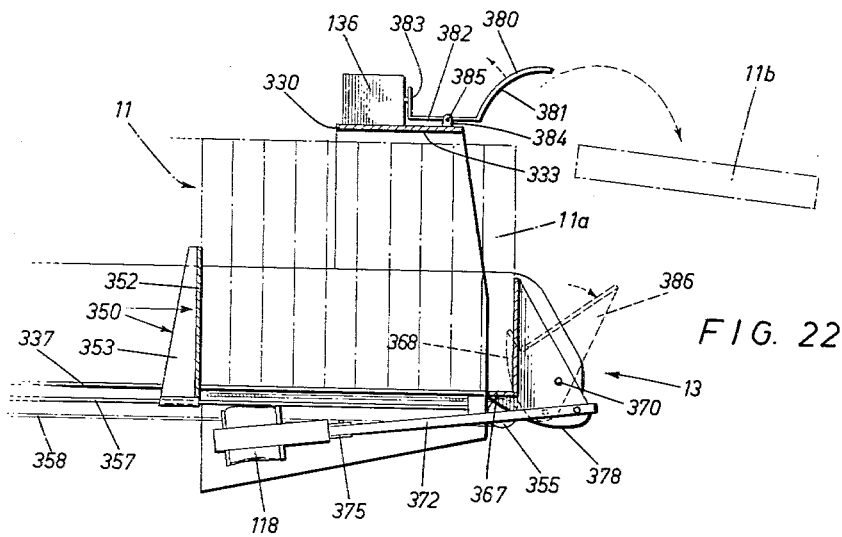
FIGURE 22 is a vertical longitudinal section taken along the line 22—22 of FIGURE 21 illustrating the package ejector in operation.
Figure 31:
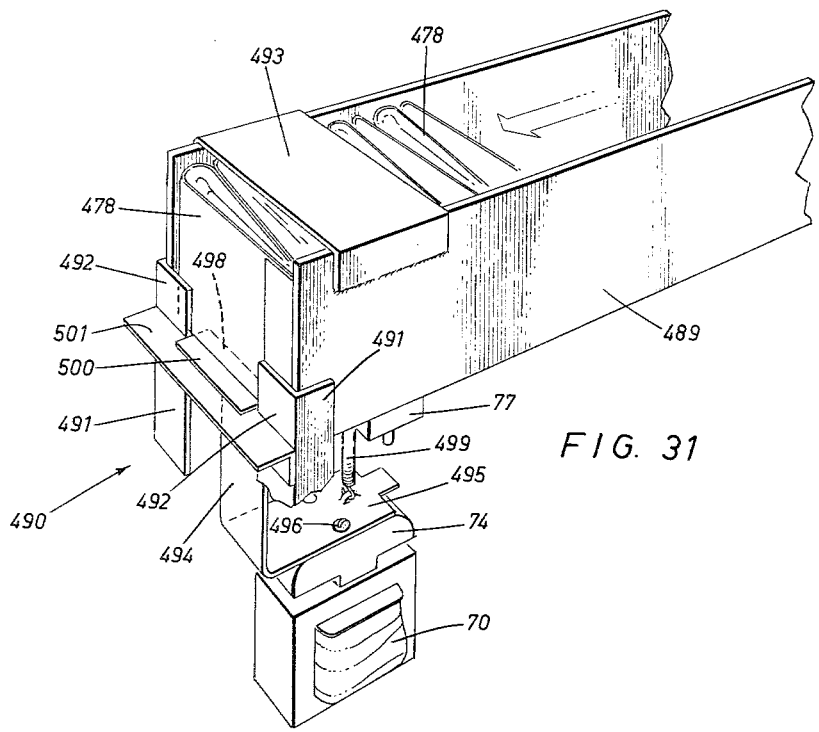
FIGURE 31 is a perspective view of the match ejector mechanism according to the present invention.

With particular reference now to FIGURES 21 and 22, each tray has a pusher device 350 adapted for slidable travel on ridges 351 formed in tray floor 337. Pusher 350 comprises a pusher plate 352 secured to upstanding member 353 which extends through longitudinal slot 354 formed in the tray floor. Member 353 has a sleeve 356 formed at its lowermost extremity encircling rod 357 which extends the length of the tray such that pusher 350 can be reciprocated within the length of the channel thereon. A tension spring 358 disposed below tray floor 337 is secured at one end to member 353, passes over sheave 355 rotatably mounted at the front of the tray, and is reversed in direction for connection to the rear of the tray for biasing pusher 350 in the direction of the arrow, thereby urging packages contained in the tray toward the package ejector device 13.

Ejector 13 comprises an angle plate 365 having an elongated normally upright portion 366 and a flanged basal portion 367 turned perpendicular to portion 366. Reinforcing members 368 and 369 rigidly secured to plate 365 intermediate the ends thereof, as illustrated, are adapted to loosely receive rod 370 which is rigidly mounted in tray wall extension 371 for pivotal movement thereon. Ejector 13 thus is pivotally mounted adjacent the forward open end of tray 10 such that flange 367 of said ejector is substantially co-planar with, and preferably slightly below, the plane of tray floor 337 for receiving packages thereon.

The housing 334 forming the lower portion of frame 330 is adapted to support solenoid 118 having a core armature 375 which is operably connected by link 372 to a lower portion of member 368 of the ejector assembly. A tension spring 373 secured at one end to armature 375 and at the other end to housing 334 is adapted to bias solenoid 118 into its extended position such that plate 366 is positioned in its normal package receiving position.

With particular reference now to FIGURE 22, a deflector plate 380 having a forward concave portion 381, intermediate web portion 382 and rear flanged portion 383 is pivotally mounted by pins 385 fixed to brackets 384 carried by frame 330 such that concave portion 381 extends forward beyond the forward edge of the top portion 333 of frame 330. A switch 136 is rigidly mounted on frame 330 such that flange 383 of deflector 380 positioned in proximity thereto will engage and close the switch upon pivotal movement of the deflector in the direction of the arrow.

Packages of varying sizes and shapes are loaded in channels 338 to 341 of each tier of trays 329 and urged to the forward end of each tray by pusher plate 350. The forward package indicated by numeral 11a is positioned on flange 367 of pivot plate 365 such that as solenoid 118 is energized, armature 375 and link 372 are retracted pivoting plate 365 in the direction of the arrow about rod 370 to the position indicated by numeral 386, package 11a is ejected upwardly and outwardly to strike deflector 380 and be deflected into chute 14 as indicated by numeral 11b. Deflector 380 is momentarily pivoted about pivot pin 385 closing switch 136 which emits an electrical pulse for reasons which will be explained hereinbelow in the description of the operation of the machine. While plates 368 and 369 are pivoted into the position indicated by numeral 386, the curved edges 378 of said members 368 and 369 block the forward movement of the packages in the tray. Upon de-energization of solenoid 118, tension spring 373 urges armature 375 to its normally extended position and plate 365 pivotally connected thereto to return to its upright position thereby allowing pusher plate 350 to advance the next package 11 into the package discharge position as indicated by numeral 11a in preparation for repetition of the ejection cycle.

The package ejected into chute 14 drops by gravity onto shelf 390 of elevator 15, illustrated in FIGURES 7, 19 and 20 and FIGURES 23 to 26 inclusive, which reciprocates vertically within said chute 14. The elevator embodiment illustrated in FIGURES 19, 20, 23 and 24 comprises a shelf 390 generally U-shaped in cross-section having a vertical side member 391 secured to its underside for pivotal securement to vertically aligned support member 393. Member 391 is pivotally mounted at one end on member 393 by pin 394 which is fixed to member 391 and which extends through an opening formed in member 393, not shown. Member 391 is connected to member 393 at the opposite end by tension spring 396 such that shelf 390 is normally seated on the upper edge 397 of member 393. The rearmost portion of member 393 has a flange 400 formed therein for rigid securement of member 393 to guide assembly 401.

Guide 401 comprises a pair of spaced apart plates 402 and 403 joined by connecting pins 404 which rotatably carry two pairs of opposed rollers 405 which are each adapted to engage the opposite edges of guide bar 408, therebetween. Guide bar 408 is rigidly secured to the machine casing vertically within chute 14 in proximity to the rear wall 398 of casing 201.

Figure 23:
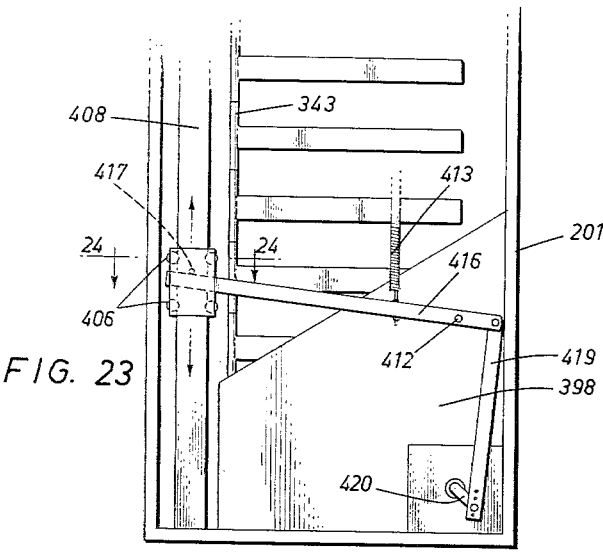
FIGURE 23 is a rear elevation of the present vending machine illustrating the elevator drive mechanism.
Figure 24:
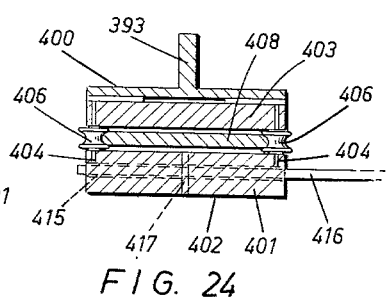
FIGURE 24 is a sectional view taken along the line 24—24 of FIGURE 23.
Figure 11:
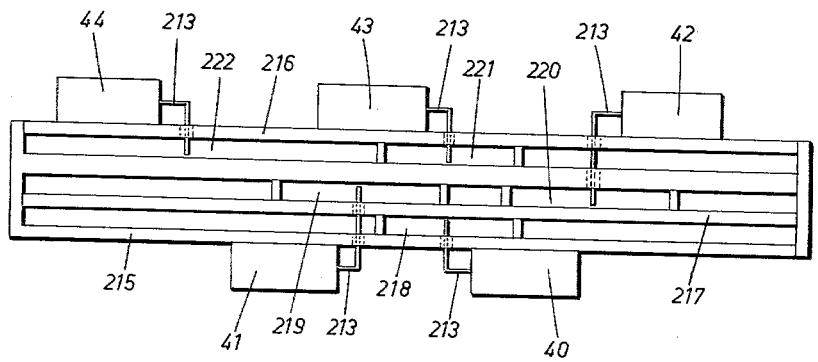
FIGURE 11 is a plan section of a coin controlled signal emitting device employed in the present vending machine taken along line 11—11 of FIGURE 9.
Figure 19:
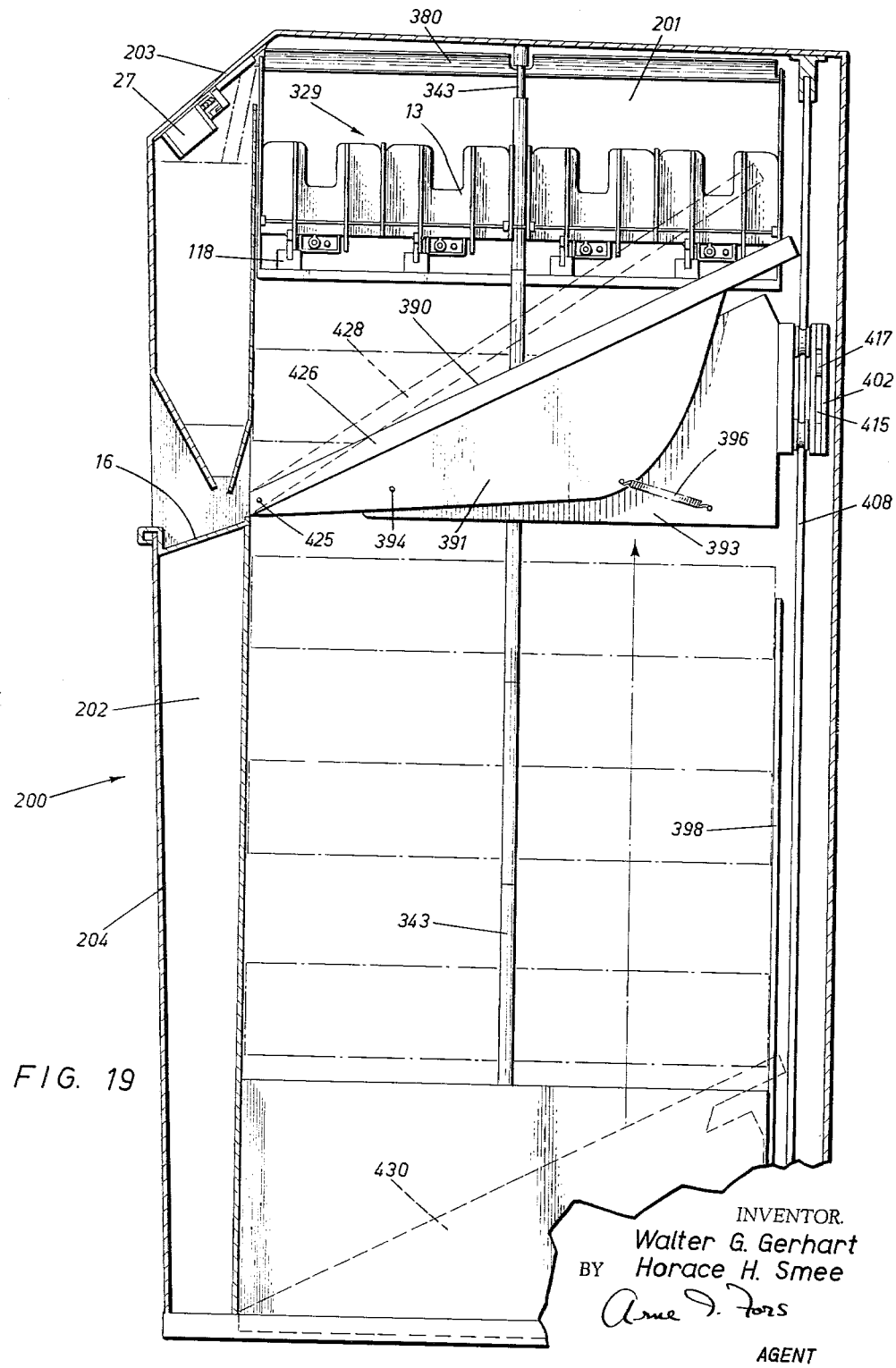
FIGURE 19 is a side elevation, partly cut away, of the present vending machine illustrating an embodiment of the elevator in its operational positions.

Turning now to the elevator lift mechanism, and with particular reference to FIGURES 19, 23 and 24, an elongated slot 415 formed transversely in plate 402 is adapted to loosely receive one end of lever 416 therein. A pin 417 extending across slot 415 perpendicular to the long axis of lever 416, provides a fulcrum for lever 416. Lever 416 is pivotally mounted across the rear of the machine casing 201 by stub shaft 412 fixed to rear wall 398 of the casing such that one end of the lever is slidably inserted in slot 415 of plate 402 and the opposite end pivotally connected to pitman 419. Pitman 419 is in turn pivotally connected to crank 420 which is rigidly secured to a rearward extension of shaft 278 coupled to the prime mover 78 as described hereinabove. It will be apparent that as shaft 278 rotates through a cycle, the crank and lever system will raise and lower shelf 390 within chute 14; lever 416 continuously bearing on pin 417 in slot 415. A tension spring 413 connected at one end to lever 416 and at the other end to an upper part of wall 398 substantially counter-balances the weight of shelf 390. With reference now to FIGURES 7, 19 and 20, shelf 390 has a stud 425 secured to and projecting from shelf flange 426 adapted to engage stud 427 secured to and projecting from side wall 418. As shelf 390 reaches the peak of its travel, as indicated by numeral 428, stud 425 engages stud 427 causing shelf 390 to tilt forward about pin 394. In that shelf 390 is normally inclined at about 20° to the horizontal, it will be evident that as the shelf is further tilted, any object carried on said shelf will slide by gravity into tray 16 aligned with the shelf at this point of maximum elevation. FIGURE 19 also illustrates, by the broken lines identified by numeral 430, the bottom level of vertical travel of shelf 390 within chute 14.

Figure 25:
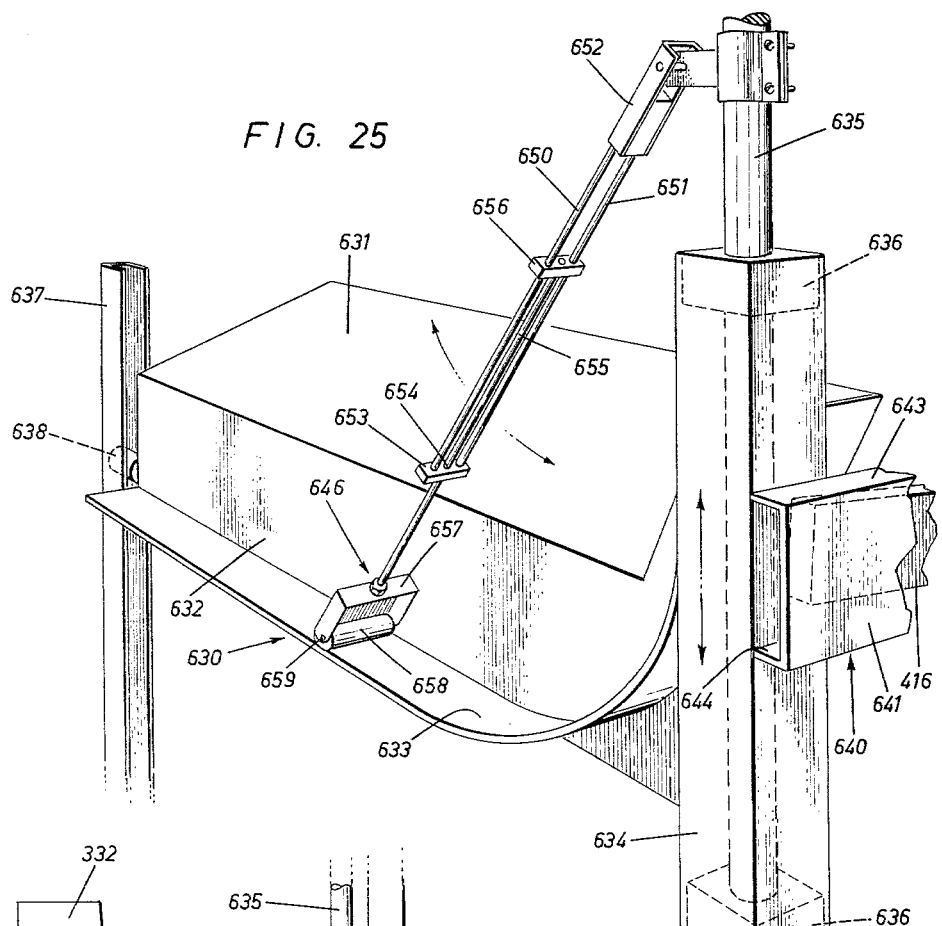
FIGURE 25 is a perspective view, partly cut away, of another embodiment of elevator tray.
Figure 26:
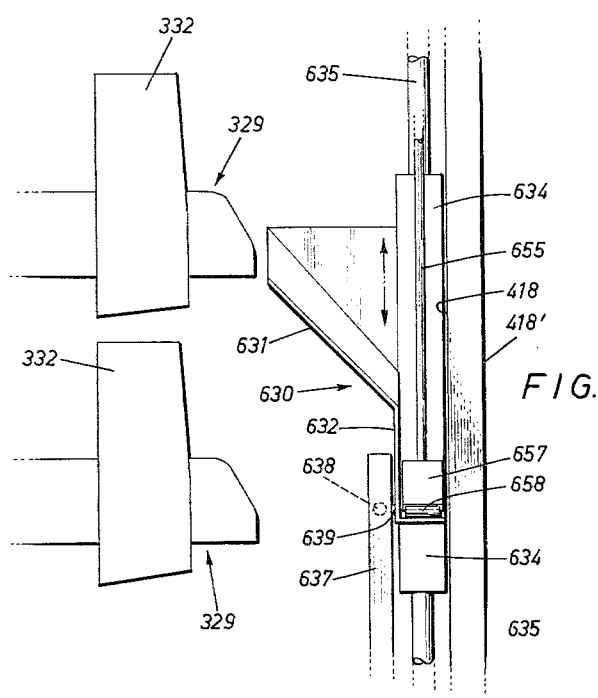
FIGURE 26 is a front elevation of the tray illustrated in FIGURE 25.

A second embodiment of the elevator tray and discharge mechanism is illustrated in FIGURES 25 and 26 and comprises a shelf 630 having an outwardly inclined upper portion 631, vertical intermediate portion 632 and horizontal flanged portion 633 formed at its lowermost extremity. Flanged portion 633 is turned, at its rearmost extension, through an arc of 90° such that its upper extremity is substantially tangential to sleeve 634 to which it is rigidly secured. Sleeve 634 is loosely slidably mounted on vertical guide rod 635 by a pair of spaced, self-aligning bushings 636 fixed within said sleeve.

The forward end of shelf 630 is guided for vertical travel within chute 14 by a channel 637 disposed vertically in proximity to the forward end of wall 418. A roller 638 pivotally mounted on pin 639 which is fixed to vertical wall 632 of tray 630, travels within channel 637. Thus it will be evident that tray 630 is adapted to reciprocate in a vertical plane within chute 14 and bear a predetermined spaced relation to side wall 418 such that packages dropped onto tray flange 633 will be supported on one edge between wall 632 and said cabinet wall 418. It will be pointed out that wall 418 preferably is set-in from the cabinet outer wall 418' to ensure that wall 418 is maintained plumb.

Shelf 630 is raised and lowered by lever 416 having one end adapted to be inserted and received within rectangular box 640. Box 640 comprises a side wall 641 spaced a predetermined distance from wall 642 of sleeve 634 and secured thereto by upper and lower walls 643 and 644 to define a rectangular space therein. Lever 416 is raised and lowered by means illustrated and described hereinabove with reference to FIGURE 23.

Figure 6:
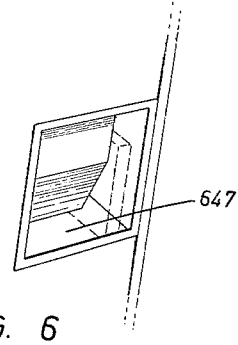
FIGURE 6 is a perspective view of another embodiment of casing outlet.

For positive ejection of articles from the shelf, a pusher assembly 646 is pivotally mounted on the upper portion of guide rod 635 and is adapted to extend downwardly onto flange 633 of the shelf 630 as the shelf travels upwardly towards discharge tray 647 shown in FIGURE 6. Pusher assembly 646 comprises a telescopic arm having, for example, a pair of rods 650 and 651 rigidly secured to channel 652 which is pivotally connected to rod 635. The forward ends of rods 650 and 651 are held a spaced distance apart by a yoke 653 rigidly secured thereto. An opening 654 formed in the centre of yoke 653 slidably receives rod 655 therein. The rear end of rod 655 is rigidly secured to a second yoke 656 which is adapted for slidable travel on rods 650 and 651. The forward end of rod 655 is secured to a channel 657 which houses a roller 658 pivotally mounted therein by pin 659 for rotatable travel on flange 633.

It will be evident that when shelf 630 is at the bottom of chute 14, assembly 646 will hang substantially vertically within the chute. As shelf 630 is raised, roller 653 follows the curvature of flange 633 and is deflected to the forward end of said shelf thereby ejecting a package contained on said shelf through the vertical opening formed in tray 647 as illustrated in FIGURE 6.

Figure 28:
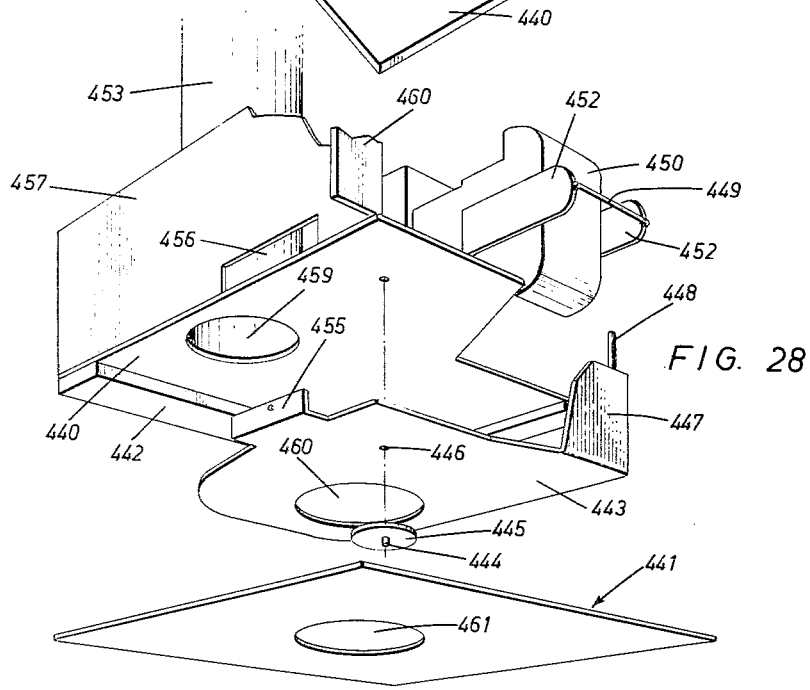
FIGURE 28 is an exploded perspective view of the coin changer mechanism illustrated in FIGURE 27.

The coin changer mechanism 430 to 432 inclusive, illustrated generally by FIGURES 9 and 10 and more in detail by FIGURES 27 and 28, each comprises a pair of plates 440 and 441 secured a predetermined distance apart along two sides by a spacer 442 and connecting pins extending therethrough, not shown. A third plate 443 is pivotally mounted between plates 440 and 441 by stub shaft 444 which carries a spacer washer 445 below plate 443 for reasons which will become apparent as the description proceeds. Shaft 444 is journalled into the adjacent faces of plates 440 and 441 and passes through opening 446 formed in plate 443. One side of plate 443 is provided with an upturned flange 447 which carries an upwardly projecting stud 448 fixed thereon. Stud 448 is adapted to be engaged by arm 449 which is secured to armature 450 of solenoid 451 by a pair of brackets 452. The solenoid is identified by numeral 451 for illustration only and represents any one of solenoids 95, 99 and 108 as described hereinabove with reference to FIGURE 2. It will be evident that as armature 450 is retracted upon energization of solenoid 451, flange 447 will be displaced in the direction of the arrow causing plate 443 to pivot about shaft 444 in a counter-clockwise direction as viewed in FIGURE 27.

A second upturned flange 455 provided on another side of plate 443 is adapted to be substantially in alignment with opening 456 formed in upturned flange 457 of upper plate 440. A tension spring 458 secured to flange 455 and extending through opening 456 for securement to upper plate 440 is adapted to bias plate 443 in a clock-wise direction as viewed in FIGURE 27.

A coin-storage tube 453 is secured to upper plate 440 substantially concentric with opening 459 formed therein by spot welds or the like means. An opening 460 is formed in center plate 443 such that opening 460 is axially aligned with opening 459 when plate 443 is pivoted by solenoid 451 to its position of maximum angular displacement. An opening 461 is formed in bottom plate 441 such that said opening is in alignment with opening 460 when center plate 443 is returned to its at-rest position under the bias of tension spring 458. It will be evident that when the change-making mechanism is at its at-rest position, plate 443 will underlie and block opening 459 of upper plate 440 which is axially aligned with coin tube 453. Upon energization of solenoid 451, plate 443 is pivoted such that opening 460 formed therein is aligned with opening 459 permitting a coin to drop by gravity thereinto. Lower plate 441 preferably is spaced from upper plate 440 a distance slightly greater than the thickness of each of the coins contained in the coin tube 453 such that as solenoid 451 is de-energized and plate 443 returned to its at-rest position by spring 458, one coin is sliced from the stack of coins and displaced laterally to a position over opening 461 such that it drops therethrough. Lower plate 441 can be spaced from upper plate 440 a distance slightly greater than the composite thickness of two or more coins, of course, if it is desired to discharge more than one coin at a time.

Figure 29:
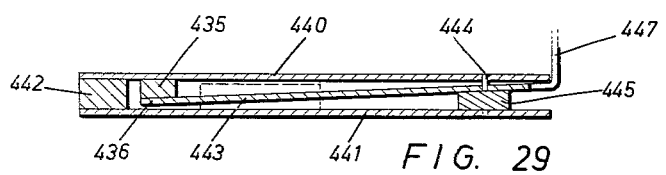
FIGURE 29 is a section taken along the line 29—29 of FIGURE 27.

With reference now to FIGURE 29, it will be seen that center plate 443 is positioned in a plane diagonal to the parallel planes of upper and lower plates 440 and 441 by spacer washer 445 mounted therebelow on stub shaft 444 at one end and spacer 435 secured thereabove at the opposite end. By so aligning plate 443, it will be evident that the weight of coins in tube 453 bearing on plate 443 will be transferred to lower plate 441 at the outer edge 436 of center plate 443 only. Thus the resistance to pivotal movement of plate 443 is substantially overcome.

Each of the coin changer mechanisms is secured to the inside of front panel 204 by attachment of flange 460 formed in one edge of flange 457 to a bracket, not shown, which is pivotally mounted on panel 204 for ease of loading. A chute 463 disposed below each of the bottom plates 441 in communication with opening 461 for receiving coins therefrom and for directing the coins into vertical chute 464 is connected by welds at one end to vertical chute wall 465 and at the other end by abutment to the underside of plate 441. The coin changer mechanisms preferably are inclined about 45° to the horizontal such that the side wall of coin tube 453 supports part of the weight of coins contained therein; pivot plate 443 thereby having to support the remainder only of the weight of the coins.

A switch 146 secured to flange 457 operably supports an upwardly biased arm 299 which extends into coin tube 453 through opening 300 formed in the wall of said coin tube. Arm 299 is adapted to be engaged by coins carried in coin tube 453 and to be displaced downwardly to open switch 146. It will be evident that upon tube 453 being depleted of coins, arm 299 will be biased upwardly closing switch 146. The operation of the circuit embodying the switch has been described hereinabove with reference to the description of the circuit of FIGURE 2 and the accumulator mechanism illustrated by FIGURES 14 and 16.

The location of the several change-making mechanisms within the electrical circuit has been described above with reference to FIGURE 2 and their operation therewith will be further described hereinbelow with reference to the description of the operation of the machine.

The match dispensing unit XIII will now be described with reference to FIGURES 7, 10 and 30 through 32. This unit comprises a substantially circular housing 475 of generally rectangular cross-section which may be formed from a pair of equispaced channels 476 and 477 secured by spot welds to a back plate 298. Plate 298 preferably is secured to the inside of front panel 204 by three coil shock-absorbing springs 471 secured equispaced about the circumference of said housing and secured to panel 204 by tabs 472 spot-welded thereto. Packs of matches 478 can be stacked between channels 476 and 477 and guided therein by inwardly projecting flanges 479 and 480. The match packs are inserted at the open end 482 of the housing and urged in a counter-clockwise direction as viewed in FIGURES 7 and 30 by pusher 483 which is adapted to project through the opening defined by flanges 479 and 480 into housing 475. Pusher 483 consists of a rigid, preferably tubular arm member 485 pivotally mounted on stub shaft 486 which is affixed to the central portion of plate 298 subtsantially concentric with housing 475. A torsion coil spring 487 operably connected to arm 485 and to plate 298 biases said arm in the direction of the arrow, that is, in a counterclockwise direction. A sleeve 488 slidably mounted on arm 485 has a projection, not shown, formed thereon adapted to project into housing 475 for engagement with the match packs, thereby advancing said packs to the discharge end of the housing.

The discharge end of circular housing 475 is connected tangentially to a lineate section of channel 489, also rectangular in cross-section and open on its upper side, such that match packs 478 contained in housing 475 will freely pass thereinto and be directed to ejector mechanism 490. Channel 489 preferably is weld secured to plate 298 by flange 481. Solenoid 70 is supported by suitable brackets 491 which are connected by welds to one side of tube 489 at its discharge end and to the solenoid by bolts, not shown. The inwardly disposed flanges 492 of brackets 491 are adapted to partially close the lower end of channel 489 such that a match pack 478 is positioned thereon preparatory for ejection. A section of channel 493 is weld secured across the open side of channel 489 above the second pack of matches such that the first pack can be ejected upwardly out of channel 489 by the ejector mechanism to be described hereinbelow while said second pack is restrained from upward movement by channel 493.

The ejector mechanism comprises a slidably mounted plate 494 having its ends oppositely flanged for rigid connection of one flange 495 to armature 74 of solenoid 70 by screws 496 such that the opposite flanged end 498 will be free to reciprocate transversely within channel 489.

Upon energization of solenoid 70, armature 74 is withdrawn into solenoid 70 taking plate 494 therewith until flange 500 abuts angle member 501 which is secured crosswise to brackets 491. A pack of matches is urged forward to abut flanges 492 of brackets 491 by pusher 483 acting on the file of matches. Upon de-energization of solenoid 70, armature 74 is quickly returned to its extended at-rest position by spring 499 whereby flange 500 engages match pack 478 and ejects said match pack upwardly from the channel to strike deflector 502 and be directed into discharge tray 16.

A switch 77 secured to the underside of channel 489 is adapted to be abutted by core armature 74 upon de-energization of winding 70 to open contact 72 preparatory for the next cycle.

Figure 33:
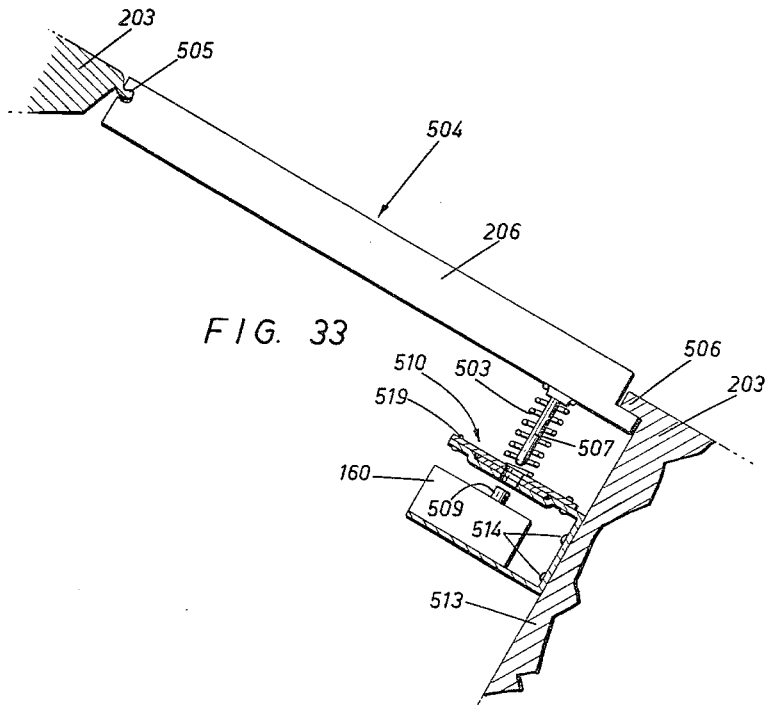
FIGURE 33 is a side elevation, partly in section of the select button structure, taken along the line 33—33 of FIGURE 5.
Figure 34:
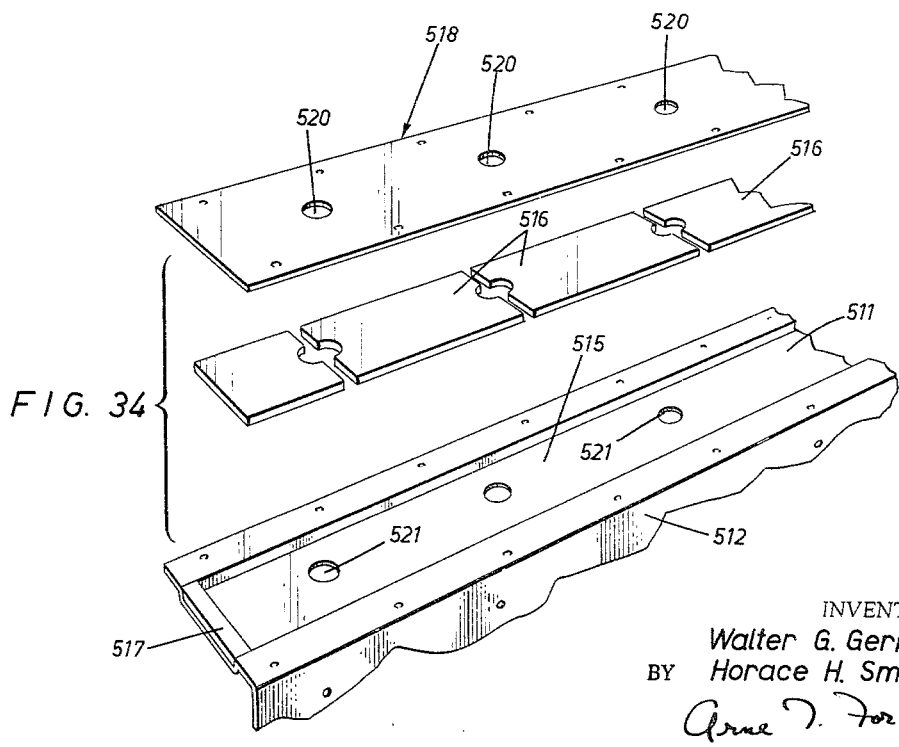
FIGURE 34 is an exploded perspective view of the key lock-out mechanism illustrated in FIGURE 33.

A plurality of selector button mechanisms 504, illustrated generally by FIGURE 5 and more in detail by FIGURES 33 and 34, each comprises a key 206 pivotally mounted at its upper end by hinge pin 505 secured to upper front panel 203. The opposite lower end of key 206 is adapted to support a finger 507 depending downwardly at right angles therefrom for selective abutment with plunger 509 of switch 160. The lower end of finger 507 is spaced a predetermined distance from plunger 509 when in its upwardly biased, at-rest position, for disposition of lock-out mechanism 510 therebetween.

A compression coil spring 503 wrapped loosely about finger 507 is contained at its ends by the underside of key 206 at one end and lock-out 510 at its opposite end. It will be apparent that spring 503 will normally bias key 206 upwards into abutment with projection 506 of the casing 203.

Lock-out 510, so constructed that only one selector key 206 can be depressed at a time, comprises a lower plate 511 having a flange 512 formed along one edge for securement of said plate to panel wall 513 by bolts 514. A shallow channel 515 formed longitudinally in plate 511 is adapted to receive segment plates 516 for slidable movement therein. The length of segments 516 substantially corresponds to the lateral spacing of fingers 507. The ends of said segments have arcuate portions removed from the central portions thereof and the edges bevelled upwardly to facilitate the insertion of a finger 507. Sliding movement of the segments is limited by end stops 517 rigidly secured to plate 511 at opposite ends of channel 515. These end stops are spaced apart a distance equal to the sum of the lengths of all the segments 516 plus a distance slightly less than one-half the diameter of a finger 507.

An upper plate 518, substantially co-extensive with lower plate 511, is rigidly secured to said lower plate by securing means such as rivets 519. A plurality of openings 520 and 521 are formed in upper and lower plates 518 and 511 respectively substantially in axial alignment with fingers 507 such that said fingers can be inserted, upon manual depression of keys 206, through said openings for abutment with plungers 509 of switches 160. It will be evident, however, that the lock-out mechanism 510 disposed between fingers 507 and switches 160 operates to permit the depression of only one key 206, at a time, in that when any finger 507 is depressed, it is driven between two of the lock-out segments 516, thus spreading the segments longitudinally in channel 515, and thereby blocking the remaining holes 521 formed in lower plate 511.

The location of switches 160 in the electrical circuit has been described hereinabove with reference to the description of FIGURE 2.

*The operation*

In the operation of the vending machine according to the present invention, the coins are inserted in coin slot 17 located on upper panel 203 and pass through aperture 212 formed in plate 26 which is connected to the core armature 213 of solenoid 27. Aperture 212 is aligned with slot 25 upon the energization of solenoid 27 which is normally energized while motor unit IX is inoperative or beginning and ending a cycle whereby cam-operated switch 28 is maintained in its normally-closed reset position. It will be evident that if the power supply is disrupted, solenoid 27 will be de-energized permitting aperture 212 of plate 26 to be moved out of alignment with slot 17 thereby preventing the insertion of coins into the vending machine.

The coins upon dropping by gravity through coin slots 25 and 212 into and through the conventional slug rejector and coin sorter I are directed into the proper coin paths 218 to 222 inclusive in the coin switch unit II for actuation of the coin value switches 40 through 44 having arms 213 operably connected thereto and extended into the respective coin paths.

Penny switch 40, when actuated by a penny dropping through coin path 218 and engaging arm 213, emits an electrical pulse through normally-closed switch 71 to the winding of solenoid 70 and energizes the solenoid to retract core armature 74 against the bias of spring 499 as illustrated in FIGURE 30. The shoulder on core armature 74 deflects the slidably mounted bar 74a operably connected to switch 77 thereby opening contacts 71 and closing normally open contacts 72 maintaining solenoid 70 energized and holding core armature 74 in its retracted position. The purchaser then manually depresses match selector switch 73 which opens the circuit to de-energize solenoid 70. Upon core armature 74 returning to its extended position under the tension of spring 499, a match pack 478 is ejected from housing tube 489 into discharge tray 16.

Switch 41 is adapted, in the present embodiment, to be actuated by a 5 cent coin thereby emitting an electrical pulse by way of contacts 224 of relay 223 to the winding of solenoid 46 to advance accumulator ratchet wheel 280 through an angular displacement of 15° about the periphery of the accumulator drum. For the purposes of illustration, a unit base value has been assumed at 5 cents and the rotational displacement of the accumulator drum is based on multiples of 5 cents. It will be understood, of course, that the unit value could be changed as desired and/or tokens substituted for coins without departing from the spirit of the present invention.

Switch 42 is adapted to be actuated by the second multiple of the base value, that is, by a 10 cent coin, in order to emit an electrical pulse to the winding of solenoid 47 to rotationally advance ratchet wheel 280 about 30°. In like manner, switch 43 is adapted to be actuated by a 25 cent coin, that is, a fifth multiple of the unit base value, to emit an electrical pulse to winding of solenoid 48 by way of contacts 275 of relay 49 for rotationally advancing ratchet wheel 280 about 75°. Switch 44 is arranged in series with a relay coil 49 such that actuation of switch 44 closes said relay which in turn energizes solenoids 48 and 592 thereby rotatably advancing ratchet wheel 280 in two stages a total of about 150° equivalent to a 50 cent credit.

The energy pulses thus emitted, in accordance with the value and the order of the coins inserted, rotationally advance ratchet wheel 280 and the accumulator drum through an angular displacement to establish a credit corresponding to the total value of the coins inserted. The actuation of the coin value switches is independent of the order of insertion of the coins of various denominations and the total value credited can be thus attained by insertion of coins of any value and in sequential order within the range of values normally encountered in commerce. The range of values can, of course, be readily extended by making provision for coins of smaller or larger values, if desirable.

The coins, having actuated at least one of the coin value switches 40 to 44 inclusive in the coin switch block II, drop by gravity into escrow unit III which has been described in detail hereinabove with reference to FIGURES 2, 12 and 13. If the purchaser desires to recover the deposited coins without making a selection, he manually depresses the reject selector 207 which closes switch 75 thereby energizing prime mover IX and initiating its rotation through a cycle. As prime mover IX cycles, normally open cam switch 145 is closed sending an electrical pulse via normally closed relay-actuated switch 79 to the winding of reject solenoid 80. Solenoid 80 is operably connected to base plate 81 of the escrow unit such that said base plate 81 is pivoted in a clock-wise direction as viewed in FIGURE 12. Coins contained therein are discharged into chute 19 which directs the coins into outlet tray 16. As prime mover IX rotates through its cycle, reset lever 315 biased against the peripheral edge 319 of disc 318, as illustrated with reference to FIGURE 14, engages a projection 317 affixed to disc 318 to rotate the accumulator drum therewith. The drum is thus rotated with shaft 278 until the cycle is completed and the drum is reset at its position of zero angular displacement.

The operation of the invention will now be described with reference to the first embodiment of the price setting system illustrated in FIGURES 2, 3, 14, 16 and 17 wherein switches 55 to 59 are arranged in box 54 on the vertical portion 286 of support 285 and switches 60 to 64 are arranged on the horizontal portion 287 of support 285 such that the switches are disposed, for convenience, in a 75° angular separation relative to the rotation of accumulator drum 50. That is, when the sleeve projections 291 are rotated through 75°, and clear the row of switches 55 to 59, they then engage the row of switches 60 to 64 actuating the latter in the same manner.

As the outer sleeve 277 of the accumulator is rotated to a 50 cent accumulated value, as indicated by a drum rotation of 150°, a plurality of depressions 292 permit the arms operably connected to the respective switches to become depressed, thereby closing the lower contacts of the double-throw switches. FIGURE 35 illustrates graphically the value switches actuated corresponding to the various angles of rotation of sleeve 277, for reasons which will become apparent. This graph illustrates the preferred combination of value switch actuations which permit change making where the value deposited is greater than the value of the article purchased. For example, the insertion of a 50 cent piece causes the closing of the 25, 30, 35, 40, 45 and 50 cent switches. Thus a purchase could be made at any of these values and the correct change automatically provided based on the difference between the 50 cent credit and the purchase price. The value switches intermediate of the 25 cent multiple values are closed according to the normal combinations of coins inserted. That is, lacking correct change, a purchaser would not deposit more than 35 cents, a quarter and a dime, to make a 30 cent purchase; deposit more than 40 cents, four dimes, to make a 35 cent purchase; nor deposit more than 45 cents, a quarter and two dimes to make a 40 cent purchase, unless he inserted quarters only. Thus the closing of switches intermediate of the 25 cent multiples is based on 5 cent overages only.

The operation of the machine employing this price-setting system will now be described with bridge 87 inserted in row F, which represents a 30 cent price. For the purpose of illustration, it will be assumed that the correct change of 30 cents for a 30 cent purchase is inserted in the machine, switch 60 thereby being actuated. Terminal 85-F is connected to one side of the power supply at lead 65 and connected via terminal 114 to winding 111. Winding 111 is connected in series to vend solenoid 118 through selector switch 206 and to one of terminal strips 88. Upon closing of selector switch 206, representing the selection of goods at the 30 cent price, solenoid 118 is energized ejecting a package which in turn closes sold-out tester switch 136. Switch 136 emits a pulse to winding 153 of the accept solenoid thereby pivoting base member 81 of escrow unit III such that coins contained in said escrow unit are deflected into the coin bag 18, the shoulder of the moving core armature 243 closing switch 150 thereby maintaining winding 153 energized until cam switch 76 is opened. Because winding 111 is connected in series with vend solenoid 118, winding 111 receives a pulse which causes the armature 115 of the relay actuated switch 116 to close the holding circuit for relay winding 111. Winding 111 thereby remains energized until normally closed cam-operated switch 117 is opened.

The actuation of armature 115 closes switch 119 to energize prime mover IX which in beginning its cycle closes cam switch 76. Switch 76 continues the energization of said prime mover until the cycle is completed. The energization of prime mover IX also energizes relay coil 223 connected in parallel thereto to close contact 225 thereby energizing solenoid 46 which retracts lever 268 and pawl 281 carried thereby to release the ratchet wheel 280 and accumulator drum for rotational movement.

In travelling through its cycle, prime mover IX rotates the several cams which actuate their respective switches. Since correct change was inserted in the machine, although the change actuator control switch is closed, it cannot emit signals to its respective change making mechanisms in that the circuits are open at the bridge block; terminals 90-F and 96-F being isolated from the power supply.

Switch 117 is opened de-energizing relay winding 111 to return armature 115 to its at-rest position. Prime mover IX completes rotating until it reaches the accumulator drum zero reset position whereby cam 305 opens switch 76 de-energizing the motor, de-energizing the escrow accept solenoid 153 and closing the circuit to the coin lock-out solenoid 27 to align slot 212 with coin slot 17 and apply a voltage potential to the coin actuable value switches. The machine is now reset and ready for its next operational cycle.

The operation will now be described with bridge 87 in row F indicating the 30 cent price range, but with the insertion of 35 cents in change for closing of switches 60 and 61 and energization of terminals F and G. Referring now to FIGURE 35, it will be apparent that with the exception of the base 5 cent value, the closing of a switch which indicates the accumulated credit for coins deposited necessitates the closing of the switch of next lower value. Turning now to FIGURE 3, terminal 85-G is connected to terminal 90-F which is in contact with bridge terminal 121 and switch 120. Upon actuation of selector switch 206, vend solenoid 118 is energized ejecting a package which closes switch 136 which, in turn, energizes the components as described hereinabove with relation to the insertion of correct change including energizing the winding 111 of relay 87. Relay 87 closes switch 120 which communicates row 90 with row 91 and with the 5 cent change actuator winding 95 through normally closed switch 92 to await a pulse from timing switch 145 adapted to be actuated by cam 306.

Upon energization of prime mover IX by the closing of relay switch 119, the cams are rotated as described above with relation to the correct change operation. Normally-open switch 145 is closed three times in succession during the cycle emitting a pulse during the first closure through contact 140, which is closed during the energization of the accept solenoid, to the 5 cent change actuator solenoid 95, causing a nickel to be ejected upon the de-energization of the winding. As described hereinabove, the timing cams reset the machine components to their at-rest coin-receptive positions.

Thirdly, the operation of the invention will be described on the basis of 50 cents being deposited for the purchase of a 30 cent item. Switch 64 is actuated communicating block terminal 85–J with the power supply. Also, switches 59 through 63 are actuated, as illustrated by FIGURE 35, permitting the purchase of an item between the price range of 25 to 50 cents, depending on the location of bridge 87 in the bridge block. It may be preferred to use several bridges 87 depending on the number of sales prices required. The graph illustrated by FIGURE 35 shows the switches that are actuated for each fifth multiple of the unit value; i.e. 25 cent, 50 cent, 75 cent and one dollar values. Also, it is to be noted that switch 92 is actuated for each of the fifth multiples of the base value for reasons that will become apparent as the description proceeds.

Switch 85–J is wired to terminal 96–I which in turn is connected to terminals 96–E through 96–H inclusive. It will be evident that the row 96 terminals are connected by way of bridge terminal 127 and switches 125 and 126, which are closed when the purchaser makes his selection as described hereinabove for actuating armature 115, to strip 93. Strip 93 is directly connected to the 5 cent changer by way of switch 92 and row of sockets 97, each of which is connected to the 10 cent changer solenoid 99 or 20 cent relay 130. Upon closing of cam switch 145, by cam 306, a pulse is directed through relay switch 140 which is closed when the accept solenoid is energized, to the 10 cent change actuator solenoid 99. Relay 130, which was energized when switch 126 was closed, is held in its energized position by switch 102 and normally closed cam switch 151 permitting pulses of electricity to be directed to the 10 cent change actuator solenoid 99 when switch 145 is actuated thrice during the rotation of triple lobed cam 306, thereby ejecting two dimes. Upon the opening of switch 151 by cam 308, relay coil 130 is de-energized after the second closing of switch 145. The prime mover IX completes cycling until the accumulator drum is reset to its zero position as described in the examples hereinabove.

It will be apparent that the insertion of bridge 87 in any of rows E through J will provide selection of prices from 25 to 50 cents in value and automatically provide for change of from 5 to 25 cents for a 50 cent deposit. The opening of switch 92, for each fifth unit multiple, isolates rows 90 and 91 which would otherwise energize the 5 cent changer. The bridging unit is adapted, for the fifth multiples, to connect the desired 5 cent, 10 cent and 20 cent relays according to the difference in value between the deposit credit and purchase price up to a maximum of 25 cent change.

If it is desired to vend matches and return 1, 2 or 3 pennies in change for a purchase at a given unit value price, terminals 104, 105 and 106 can be connected, as desired by terminals 87b, 87c or 87d to the respective solenoid windings 70 and 108. Upon closing of relay 87 when a purchase is made, and upon actuation of accept solenoid 153 and closing of relay switch 140, a pulse from cam-actuated switch 145 energizes the penny solenoid winding 108 or 2 cent pay-out relay 109 to eject the coins and/or is directed to switch 138 by way of terminal 87d and terminal strip 106 to switch 71 and match winding 70.

The operation of the price-setting accumulator system illustrated schematically in FIGURE 4 and structurally in FIGURE 18 will now be described. It will be noted that the electronic circuitry of this embodiment is combined with mechanical devices for the performance of functions which are substantially the same as those provided by the price-setting and accumulator system illustrated schematically in FIGURE 3. In that the functional effect of the two embodiments within the machine is similar, the leads communicating the two central systems with the machine components are identified by common numerals. Also, in that the switch relays in both embodiments are substantially identical, each relay is identified generally by the numeral 87 and the common switches identified by common numerals.

The accumulator drum indicated by numeral 611 is rotatably advanced by 5, 10, 25 and 50 cent pieces in a manner identical to the advancement of drum 50 carrying sleeve 277. A pair of discs 590 and 591 carrying switches 560, 561, and 562, as described hereinabove with reference to FIGURE 18, are substituted for bridge block 86 and the plurality of switches 55 to 64. Discs 590 and 591 are mounted concentric with drum 50 such that said drum will freely rotate in disc openings 612 and switches 560, 561 and 562 will be engageable at selected price levels by shoulder 610 formed on the drum.

By way of illustration, the operation of this price-setting system will be described with the insertion of the correct change of 30 cents for a 30 cent purchase. Disc 590 is set, by the operator, relative to drum 50 such that the drum must rotate through 90°, equivalent to a 30 cent credit, to permit engagement of drum shoulder 610 with switch 560. The closing of switch 560 permits energization of relay solenoid 111 and energization of one of the vend solenoids 118 by manual actuation of switches 160 located in series with lines 23, 24 or 25. The energization of solenoid 111 causes armature 115 to be actuated thereby closing switch 119 to energize prime mover IX and initiate the distributing cycle of the vending machine as has been described hereinabove.

The insertion of 35 cents for a 30 cent purchase rotates drum 50 through about 105° such that switch 561 is closed. The closing of switch 561 permits the routing of an electrical pulse to vend solenoid 118 and relay solenoid 111 for initiation and completion of the vend cycle and the routing of an electrical pulse to 5 cent changer 95 upon the subsequent closing of timing switch 145 for the ejection of a 5 cent coin. Thus during the vend cycle the selected package is ejected together with a nickel change.

To permit change-making for sales at prices between the multiples of 25 cents upon deposit of 25 cents or a 25 cent multiple such as credits of 25 cent, 50 cent, 75 cent and $1.00 values, disc 590 can be adjusted relative to disc 591 by means of indices 622 and 623 such that slide contacts 574 and 581 carried by disc 591 engage one of slide contacts 571 to 573 and one of slide contacts 582 to 585 respectively. For the sale of a 45 cent article, it will be apparent that discs 590 and 591 must be adjusted relative to each other such that contact 574 abuts contact 571. Upon the insertion of 50 cents, switch 562 would be actuated thereby permitting the subsequent routing of an electrical pulse to 5 cent changer 95 by way of contacts 574 and 571. For the sale of a 40 cent article, discs 590 and 591 would be adjusted such that contact 581 abuts contact 582. Upon the insertion of 50 cents, switch 562 is actuated thereby closing the circuit to relay solenoid 111, vend solenoid 118, and 10 cent solenoid 99 by line 98 which is connected to contacts 581 and 582. In like manner, the change for sales at 35, 30 and 25 cents from the deposit of 50 cents can be regulated by adjusting the two discs relative to each other. It will be evident that the abutment of contacts 574 and 581 with contacts 572 and 583 will provide 15 cents change; contact 581 with contact 584 will provide 20 cents change; and contacts 574 and 581 with contacts 573 and 585 will provide 25 cents change.

Stop 620 fixed to disc 591 and adapted to travel in slot 621 limits the adjustment of the two discs relative to each other to about 75°, thereby providing up to 25 cents in change between each 25 cent multiple. To permit change making of 1, 2, and 3 cents and/or delivery of one match pack, switches 586, 587 and 588 can be closed, as has been described hereinabove with reference to the description of FIGURES 2 and 3.

It will be evident that a pair of discs, price-setting circuit and switch relay 87 are necessary for each price range. The number of price levels that can be established will be determined, of course, by the accommodation for discs permitted by the length of drum 50.

Provision is made for the emptying of the silver coin tubes such that the machine will function only on a correct change basis. Switches 146 and 147 located in the 5 and 10 cent change storage tubes, as illustrated in FIGURE 27, are maintained in an open position when the respective tubes are full and return to their normally closed positions when the respective tubes are empty. The closing of either of the switches 146 or 147 causes relay solenoid 148 to be energized thereby actuating a "Correct Change Only" indicator 160 in window 161 to warn the purchaser that a purchase can be made only upon the deposit of correct change. Relay 148 opens switch 35 to de-energize solenoid winding 149 of the accumulator embodiment illustrated in FIGURE 16 and shift sleeve 277 to the left, such that only the value switches illustrated graphically in FIGURE 36 are closed. In the accumulator embodiment illustrated in FIGURE 18, the opening of switch 35 opens the circuit to line 34 thereby permitting the purchase of an article upon the deposit of correct change only.

The present invention provides a number of important advantages. The vending machine is simple and aesthetic in appearance and compact. The machine permits the automatic sale of selected articles quickly and positively at substantially any price while automatically computing and providing the purchaser with correct change for overdeposit. The machine controls are arranged for simplicity of operation by the purchasing public and the single discharge outlet for the vended article and change is positioned at a convenient height for visible and ready access. A large inventory of articles of a variety of sizes can be stored within the machine; optimum utilization of machine space being permitted by the novel storage tray and elevator system. For example, it has been found that the use of a plurality of four or six tray storage tiers will permit the storage of 800 cigarette packages in a machine as compared to a capacity of 400 cigarette packages in conventional cigarette vending machines of comparable outer dimensions. The electro-mechanical components can be readily removed for replacement or servicing and are positive and substantially trouble-free in operation. The utilization of nylon bushings and nylon-to-metal contacts for moving mechanical components minimizes wear and permits rapid cycling of the machine with a minimum of undesirable sound production and noise.

It will be understood, of course, that modifications can be made in the preferred embodiments of the invention described and illustrated herein without departing from the scope and purview of the invention as defined by the appended claims.

What we claim as new and desire to protect by Letters Patent of the United States is:

1. A machine for automatically dispensing articles of merchandise which comprises, in combination: coin-receiving, evaluating, storing and signal emitting means; accumulator and accumulator advancing means adapted to be energized by said signal emitting means for advancing said accumulator according to the value of coins received; switch means operatively connected to said accumulator for indicating the total value of coins received; a plurality of horizontal article storage trays each having article ejecting means; change storing and discharging means; conduit means communicating said switch means with said article dispensing means; manually operable selector means for selecting an article at or below the value of credit indicated and energizing said article dispensing means and change discharging means; a prime mover having a rotatable shaft operably connected thereto; a plurality of timing switches operatively connected to said shaft; said manually operable selector means adapted to energize said prime mover to initiate rotation of said shaft such that said plurality of timing switches are actuated for continual cycling of said prime mover through a complete cycle, actuating said coin storing and dispensing means, completing the ejection of the selected article, and resetting the machine to its normally at-rest position.

2. A machine for automatically dispensing articles of merchandise which comprises, in combination: coin-receiving, evaluating, storing and signal emitting means; accumulator and accumulator advancing means adapted to be energized by said signal emitting means for advancing said accumulator according to the value of coins received; a plurality of normally-open switches adapted to be closed by the advance of said accumulator for indicating the total value of coins received; a plurality of horizontal article storage trays each having ejector means; change storing and discharging means; conduit means communicating at least one of said switches with said article dispensing means; manually operable selector means for selecting an article at or below the value of credit indicated and energizing said article dispensing means and change discharging means; a prime mover having a rotatable shaft operably connected thereto; a plurality of timing switches operatively connected to said shaft; said manually operable selector means adapted to energize said prime mover to initiate rotation of said shaft such that said plurality of timing switches are actuated for continued cycling of said prime mover through a complete cycle, actuating said coin storing and dispensing means, completing the ejection of the selected article, and resetting the machine to its normally at-rest position.

3. An automatic dispensing machine for delivery of an article of merchandise upon insertion of coins of at least the price of said article in any combination of said coins and upon manual selection of said articles, comprising, in combination: a plurality of stationary horizontal trays for storing articles, ejector means mounted at one end of each of said trays for ejecting said articles, an elevator adapted to receive said ejected articles and convey same to a machine discharge outlet; means for receiving and separating inserted coins and for emitting electric control impulses one for each multiple of the lowest coin value; escrow means for accepting and rejecting said coins; change-maker means; means for counting said control impulses having conduit means one for each value, at least one of said conduit means adapted to communicate said counting means with manually operable selector means and tray ejectors corresponding to values at and below the value of the inserted coins for energizing at least one of said tray ejectors and change-maker actuating means; a prime mover; and a plurality of switching means operably connected to said prime mover for selectively controlling the cycling of said prime mover through a complete cycle, actuating at least one of said escrow means and change-making actuating means, and resetting the machine to its normally at-rest position.

4. In an automatic article dispensing machine as claimed in claim 3, each of said horizontal storage trays having an elongated support member, a pusher plate slidably mounted on said horizontal support member for longitudinal movement substantially along the length of said support member, means for biasing said pusher plate toward one end of said support member, ejector means mounted at the end of said horizontal tray to which said pusher plate is biased comprising an L-shaped plate pivotally mounted in proximity to said support member such that one arm of the plate is substantially co-planar with said support member and the other arm of said plate is disposed at right angles to said support member, and solenoid means in communication with said manually operable selector means for pivoting said L-shaped plate.

5. An automatic article dispensing machine as claimed in claim 4 having switch means disposed in a spaced relation to said ejector means such that an article ejected by said ejector means will actuate said switch means, and conduit means communicating said switch means with said escrow means.

6. In an automatic article dispensing machine as claimed in claim 4, said pusher plate biasing means comprising a tension spring rigidly secured at one end to said pusher plate, a pulley rotatably mounted at the opposite end of said support member, said spring adapted to pass over said pulley and be reversed in direction to extend along the underside of said support member for securement at the opposite end of said support member.

7. In an automatic article dispensing machine as claimed in claim 3, each of said horizontal trays comprising a support member for a plurality of aligned articles supported in erect position thereon, means for advancing said articles along said support member for discharging at one end thereof, and ejector means adjacent to the end of said support member for receiving an article from said support member, and means for actuating said ejector means for discharging the article carried by said ejector.

8. An automatic article dispensing machine as claimed in claim 3, in which said elevator comprises a shelf disposed transversely of said storage trays in proximity to one end of said trays such that said shelf will receive articles ejected from said trays, a guide rod, means for slidably mounting said shelf on said guide rod such that said shelf will reciprocate in guided travel within a passageway defined within said vending machine, and means for reciprocating said shelf on said guide rod.

9. A vending machine as claimed in claim 3 in which the elevator is adapted to reciprocate vertically within the vending machine in proximity to one end of the storage trays and transversely thereof such that said elevator will receive articles ejected from said storage trays, said elevator comprising a shelf, a guide rod mounted vertically within said vending machine, support means secured to said shelf adapted to loosely slide on said guide rod for reciprocal vertical guided travel of said shelf within the vending machine such that said shelf is aligned with the machine discharge outlet at the height of its vertical travel, and means for positively ejecting the article carried by said shelf from said shelf through said discharge outlet.

10. In an automatic vending machine as claimed in claim 9, said article ejection means comprising means for pivotally mounting said shelf on said shelf support means, means for biasing said shelf in a normally at-rest article receiving and supporting position, and means for pivoting said shelf about its pivotal mount substantially at the height of the shelf vertical travel.

11. In an automatic vending machine as claimed in claim 10, said shelf ejecting means comprising pusher means pivotally mounted on the guide rod at an upper portion thereof, one end of said pusher means adapted to be engaged by the elevator shelf for guided travel thereon such that said pusher will travel from one end to the opposite end of said shelf for engagement with articles carried by said shelf for positive ejection of said articles through the machine discharge outlet substantially at the height of the vertical travel of the elevator.

12. In a vending machine as claimed in claim 3, said escrow means comprising an open-bottomed hopper having a pair of spaced side walls and a pair of spaced end walls, a closure plate adapted to abut said hopper bottom opening, means at each end of said closure plate for pivotally mounting said closure plate for pivotal movement of said plate in either of two directions, solenoid actuated means for pivoting said closure plate about either of said pivotal mounting means, and means for biasing said plate in a normally closed, at-rest position.

13. In a vending machine as set forth in claim 12, said closure plate pivotal means comprising a pair of arms disposed one on either side of said closure plate in coplanar alignment therewith when said closure plate is in its at-rest closed position, means for pivotally mounting one end of one of said arms with one end of said closure plate, means for pivotally mounting the opposite end of said arm to a side wall of said hopper, means for pivotally mounting one end of the second arm with an end of said closure plate such that said second-arm-closure plate pivotal means are axially aligned with said first arm-sidewall pivotal means, and pivotally mounting the opposite end of said second arm with the opposite side wall of said hopper such that said second arm-side wall pivotal means are axially aligned with said first arm-closure plate pivotal means.

14. In a vending machine as set forth in claim 13, each arm having tension means for biasing said arm in an upward position for maintaining the closure plate in a normally closed at-rest position.

15. In an automatic vending machine as claimed in claim 3, the change-maker means comprising means to define a coin support surface having a first opening formed therein, a plate having a second opening, means for pivotally mounting said plate on said coin support surface, means for biasing said plate such that said plate second opening is normally in alignment with said coin support surface first opening, a coin storage element having a plurality of stacked coins disposed above said pivotal plate having a discharge outlet disposed out of alignment with said coin support surface first opening, and solenoid actuated means for pivoting said plate such that said plate second opening is brought into alignment with said coin storage discharge outlet for receiving a coin in said second opening from said storage element, said plate bias means adapted to return said plate to its normally at-rest position for discharging the coin contained in the second opening through said first opening.

16. In an automatic vending machine as claimed in claim 3, change-maker means comprising a first plate having an opening formed therein, a second plate pivotally mounted on said first plate having an opening formed therein substantially of the diameter of the said first plate opening, means for biasing said second plate such that said second plate opening is normally in alignment with said first plate opening, coin storage means having a plurality of stacked coins disposed above said second plate having an opening formed therein normally out of alignment with said first plate opening, said coin storage means and said first plate bearing a predetermined spaced relation one to the other equal to at least the thickness of a coin in said coin storage means, solenoid actuated means for pivoting said second plate such that said second plate opening is aligned with said coin storage means opening permitting at least one coin to drop by gravity through said coin storage opening into said second plate opening, said plate bias means adapted to return said plate to its normally at-rest position for discharging the coin contained in the second plate opening through said first plate opening.

17. In a change-maker device as claimed in claim 16, means for pivotally mounting said second plate on said first plate such that the plane of said second plate is disposed at an acute angle with the plane of said first plate.

18. In a change-making mechanism as claimed in claim 17, means for rigidly mounting said device on a support surface such that said coin storage means are disposed at an angle of about 45° to the horizontal plane.

19. In an automatic vending machine as claimed in claim 3 said change-maker mechanism comprising a first plate having a circular opening formed therein, a second plate having a circular opening formed therein pivotally mounted on said first plate such that said second plate opening is normally aligned with said first plate opening, a third plate having an opening formed therein out of alignment with said first plate opening rigidly secured to said first plate a predetermined spaced distance therefrom, coin storage means disposed above said third plate opening in alignment therewith such that coins carried in said coin storage means can drop through said third plate opening, solenoid activated means for pivoting said second plate such that said second plate opening is aligned with said third plate opening for receiving at least one coin in said second plate opening, bias means for returning said second plate to its at-rest position such that said second plate opening is aligned with said first plate opening permitting said coin carried in said second plate opening to discharge through said first plate opening, means for disposing said second plate such that the plane of said second plate is at an acute angle with the plane of said first and third plates and means for securing said coin changing mechanism to a support structure such that said first and third plates are inclined to the horizontal plane.

20. In a change making mechanism as claimed in claim 19, a spacer washer disposed between said second and first plates concentric with the pivotal mounting such that the plane of said second plate normally is disposed at an acute angle with the plane of said first plate.

21. In an automatic package dispensing machine as claimed in claim 3, said impulse counting means comprising a rotatably mounted drum, solenoid actuated means for rotatably advancing said drum according to the total value of coins received by the machine, and switch means one for each value actuable by the rotational advance of said drum for registering a credit, said switch means being in communication with the conduit means.

22. An automatic package dispensing machine for delivery of an article upon insertion of coins of at least the price of said article in any combination of said coins and upon manual selection of said articles, comprising, in combination; a plurality of horizontal trays for storing articles, ejector means mounted at one end of each of said trays for ejecting said articles, an elevator adapted to receive said ejected articles and convey same to a machine discharge outlet; means for receiving and separating inserted coins and for emitting electric control impulses one for each multiple of the lowest coin value; escrow means for accepting and rejecting said coins; change-maker means; credit means for counting said control impulses having conduit means one for each value, at least one of said conduit means adapted to communicate said credit means with manually operable selector means and tray ejectors corresponding to values at and below the value of the inserted coins for energizing at least one of said tray ejectors and change-maker actuating means; switch means in communication with said escrow means actuable by an ejected article for controlling said escrow means; manually actuable match storing and dispensing means in communication with said credit means; and a prime mover having a plurality of switching means operably connected to said prime mover for selectively controlling the cycling of said prime mover through a complete cycle, actuating at least one of said escrow means and change-making actuating means, setting up said match pack dispensing means for ejection of a match pack, and resetting the machine to its normally at-rest coin receptive position.

23. In an automatic vending machine as claimed in claim 22, said match dispensing means comprising storage means having an outlet end for stacking a plurality of match packs, means for biasing said stack of match packs towards said outlet end, detent means formed in the outlet end of said storage means adapted to close said discharge outlet to the axial discharge of said match packs, an ejector plate slidably mounted for reciprocal travel across the end of said discharge outlet, means for biasing said plate across said outlet for normally closing said outlet to the axial discharge of match packs for abutment with said detent means, and solenoid actuated means for retracting said ejector plate permitting a match pack to advance to abut the detent means, said ejector plate bias means being adapted to positively return the ejector plate to its at-rest position such that the pack of matches abutting said detent means is ejected from said storage means.

24. In an automatic vending machine as set forth in claim 23, said match pack storage means comprising a substantially circular column open on one side and said match pack bias means comprising an arm pivotally mounted concentric with said column having a depending portion adapted to be inserted into said column for engagement with match packs contained therein, and means for biasing said arm in the direction of the outlet end of said storage means.

25. An automatic package dispensing machine for delivery of an article upon insertion of coins of at least the price of said article in any combination of said coins and upon manual selection of said articles, comprising, in combination: a machine casing; a plurality of horizontal trays for storing articles each having an elongated support member, means for pivotally and removably mounting said support member within said casing, a pusher plate slidably mounted on said horizontal support member for longitudinal movement substantially along the length of said support member, means for biasing said pusher plate toward one end of said support member, ejector means mounted at the end of each horizontal tray to which said pusher plate is biased comprising an L-shaped plate pivotally mounted in proximity to said support member such that one arm of the plate is substantially co-planar with said support member and the other arm of said plate is disposed at right angles to said support member, and solenoid means in communication with said manually operable selector means for pivoting said L-shaped plate; an elevator adapted to receive said ejected articles and convey same to a machine casing discharge outlet comprising a shelf disposed transversely of said storage trays in proximity to the tray ejectors such that said shelf will receive articles ejected from said trays, a guide rod, means for slidably mounting said shelf on said guide rod such that said shelf will reciprocate in guided travel within a passageway defined within said machine casing, and means for reciprocating said shelf on said guide rod; means for receiving and separating inserted coins and for emitting electric control impulses one for each multiple of the lowest coin value; escrow means for accepting and rejecting said coins; change-maker means; means for counting said control impulses having conduit means one for each value, at least one of said conduit means adapted to communicate said counting means with manually operable selector means and tray ejectors corresponding to values at and below the value of the inserted coins for energizing at least one of said tray ejectors and change-maker actuating means; and a prime mover adapted to actuate said shelf reciprocating means, said prime mover having a plurality of switching means operably connected thereto for selectively controlling the cycling of said prime mover through a complete cycle, actuating at least one of said escrow means and change-making actuating means, and resetting the machine to its normally at-rest position.

26. An automatic package dispensing machine for delivery of an article upon insertion of coins of at least the price of said article in any combination of said coins and upon manual selection of said articles, comprising, in combination: a machine casing; a plurality of horizontal trays for storing articles each having an elongated support member, means for pivotally and removably mounting said support member within said casing, a pusher plate slidably mounted on said horizontal support member for longitudinal movement substantially along the length of said support member, means for biasing said pusher plate toward one end of said support member, ejector means mounted at the end of each horizontal tray to which said pusher plate is biased comprising an L-shaped plate pivotally mounted in proximity to said support member such that one arm of the plate is substantially co-planar with said support member and the other arm of said plate is disposed at right angles to said support member, and solenoid means in communication with said manually operable selector means for pivoting said L-shaped plate; an elevator adapted to receive said ejected articles and convey same to a machine casing discharge outlet comprising a shelf disposed transversely of said storage trays in proximity to the tray ejectors such that said shelf will receive articles ejected from said trays, a guide rod, means for slidably mounting said shelf on said guide rod such that said shelf will reciprocate in guided travel within a passageway defined within said machine casing, and means for reciprocating said shelf on said guide rod; means for receiving and separating inserted coins and for emitting electric control impulses one for each multiple of the lowest coin value; escrow means for accepting and rejecting said coins; change-maker means comprising means to define a coin support surface having a first opening formed therein, a plate having a second opening, means for pivotally mounting said plate on said coin support surface, means for biasing said plate such that said plate second opening is normally in alignment with said coin support surface first opening, a coin storage element having a plurality of stacked coins disposed above said pivotal plate having a discharge outlet disposed out of alignment with said coin support surface first opening, and solenoid actuated means for pivoting said plate such that said plate second opening is brought into alignment with said coin storage discharge outlet for receiving a coin in said second opening from said storage element, said plate bias means adapted to return said plate to its normally at-rest position for discharging the coin contained in the second opening through said first opening; means for counting said control impulses having conduit means one for each value; at least one of said conduit means adapted to communicate said counting means with manually operable selector means and tray ejectors corresponding to values at and below the value of the inserted coins for energizing at least one of said tray ejectors and change-maker actuating means; and a prime mover adapted to actuate said shelf reciprocating means, said prime mover having a plurality of switching means operably connected thereto for selectively controlling the cycling of said prime mover through a complete cycle, actuating at least one of said escrow means and change-making actuating means, and resetting the machine to its normally at-rest position.

27. An automatic package dispensing machine for delivery of an article upon insertion of coins of at least the price of said article in any combination of said coins and upon manual selection of said articles, comprising, in combination: a machine casing; a plurality of horizontal trays for storing articles, each tray having an elongated support member, means for pivotally and removably mounting said support member within said casing, a pusher plate slidably mounted on said horizontal support member for longitudinal movement substantially along the length of said support member, means for biasing said pusher plate toward one end of said support member, ejector means mounted at the end of each horizontal tray to which said pusher plate is biased comprising an L-shaped plate pivotally mounted in proximity to said support member such that one arm of the plate is substantially co-planar with said support member and the other arm of said plate is disposed at right angles to said support member, and solenoid means in communication with said manually operable selector means for pivoting said L-shaped plate; an elevator adapted to receive said ejected articles and convey same to a machine casing discharge outlet comprising a shelf disposed transversely of said storage trays in proximity to the tray ejectors such that said shelf will receive articles ejected from said trays, a guide rod, means for slidably mounting said shelf on said guide rod such that said shelf will reciprocate in guided travel within a passageway defined within said machine casing, and means for reciprocating said shelf on said guide rod; means for receiving and separating inserted coins and for emitting electric control impulses one for each multiple of the lowest coin value; escrow means for accepting and rejecting said coins; change-maker means comprising a first plate having an opening formed therein, a second plate pivotally mounted on said first plate having an opening formed therein substantially of the diameter of the said first plate opening, means for biasing said second plate such that said second plate opening is normally in axial alignment with said first plate opening, coin storage means having a plurality of stacked coins disposed above said second plate having an opening formed therein normally out of alignment with said first plate opening, said coin storage means and said first plate bearing a predetermined spaced relation one to the other equal to at least the thickness of a coin in said coin storage means, solenoid actuated means for pivoting said second plate such that said second plate opening is aligned with said coin storage means opening permitting at least one coin to drop by gravity through said coin storage opening into said second plate opening, said plate bias means adapted to return said plate to its normally at-rest position for discharging the coin contained in the second plate opening through said first plate opening; means for counting said control impulses having conduit means one for each value comprising a rotatably mounted drum, solenoid actuated means for rotatably advancing said drum according to the total value of coins received by the machine, and switch means one for each value actuable by the rotational advance of said drum for registering a credit, said switch means being in communication with the conduit means; at least one of said conduit means adapted to communicate said counting means with manually operable selector means and tray ejectors corresponding to values at and below the value of the inserted coins for energizing at least one of said tray ejectors and change-maker actuating means; and a prime mover adapted to actuate said shelf reciprocating means, said prime mover having a plurality of switching means operably connected thereto for selectively controlling the cycling of said prime mover through a complete cycle, actuating at least one of said escrow means and change-making actuating means, and resetting the machine to its normally at-rest position.

28. An automatic package dispensing machine for delivery of an article upon insertion of coins of at least the price of said article in any combination of said coins and upon manual selection of said articles, comprising, in combination: a machine casing; a plurality of horizontal trays for storing articles, each tray having an elongated support member, means for pivotally and removably mounting said support member within said casing, a pusher plate slidably mounted on said horizontal support member for longitudinal movement substantially along the length of said support member, means for biasing said pusher plate toward one end of said support member, ejector means mounted at the end of each horizontal tray to which said pusher plate is biased comprising an L-shaped plate pivotally mounted in proximity to said support member such that one arm of the plate is substantially co-planar with said support member and the other arm of said plate is disposed at right angles to said support member, and solenoid means in communication with said manually operable selector means for pivoting said L-shaped plate; an elevator adapted to receive said ejected articles and convey same to a machine casing discharge outlet comprising a shelf disposed transversely of said storage trays in proximity to the tray ejectors such that said shelf will receive articles ejected from said trays, a guide rod, means for slidably mounting said shelf on said guide rod such that said shelf will reciprocate in guided travel within a passageway defined within said machine casing, and means for reciprocating said shelf on said guide rod; means for receiving and separating inserted coins and for emitting electric control impulses one for each multiple of the lowest coin value; escrow means for accepting and rejecting said coins; change-maker means; means for counting said control impulses having conduit means one for each value comprising a rotatably mounted drum, solenoid actuated means for rotatably advancing said drum according to the total value of coins received by the machine, and switch means one for each value actuable by the rotational advance of said drum for registering a credit, said switch means being in communication with the conduit means; at least one of said conduit means adapted to communicate said counting means with manually operable selector means and tray ejectors corresponding to values at or below the value of the inserted coins for energizing at least one of said tray ejectors and change-maker actuating means; switch means in communication with said escrow means actuable by an ejected article for controlling said escrow means; manually actuable match storing and dispensing means in communication with said credit means; and a prime mover adapted to actuate said shelf reciprocating means having a plurality of switching means operably connected thereto for selectively controlling the cycling of said prime mover through a complete cycle, actuating at least one of said escrow means and change-maker means, setting up said match pack dispensing means for ejection of a match pack, and re-setting the machine to its normally at-rest coin receptive position.

29. A horizontal tray dispenser comprising a planar support member, a pusher plate slidably mounted on said horizontal support member for longitudinal movement substantially along the length of said support member, pusher plate biasing means comprising a tension spring rigidly secured at one end to said pusher plate and a pulley rotatably mounted at the opposite end of said support member whereby said spring passes over said pulley and is reversed in direction to extend along the underside of said support member for securement at the opposite end of said support member, ejector means mounted at the end of said horizontal tray to which said pusher plate is biased comprising an L-shaped plate pivotally mounted in proximity to said support member such that one arm of the plate is substantially co-planar with said support member and the other arm of said plate is disposed at right angles to said support member, and solenoid means in communication with said manually operable selector means for pivoting said L-shaped plate.

30. In a tray dispenser as claimed in claim 29, switch means disposed in a spaced relation to said ejector means such that a package ejected by said ejector means will actuate said switch means.

31. In a tray dispenser as claimed in claim 29, each of said horizontal trays comprising a support member for a plurality of aligned articles supported in erect position thereon, means for advancing said articles along said support member for discharge at one end thereof, and ejector means adjacent to the end of said support member for receiving an article from said support member, and means for actuating said ejector means for discharging the article carried by said ejector.

32. An elevator for use with horizontal article storage trays arranged in tiered relationship one above the other in a vending machine for receiving articles from any of said trays for delivery to a common machine discharge outlet in which the elevator comprises a shelf disposed transversely of said storage trays in proximity thereto such that said shelf will receive articles ejected from said trays, a guide rod, means for slidably mounting said shelf on said guide rod such that said shelf will reciprocate in guided vertical travel in a passageway defined within said vending machine from the level of the lowermost tray to the level of the common machine discharge outlet, and means for reciprocating said shelf on said guide rod.

33. An elevator for use in a vending machine in which the elevator is adapted to reciprocate vertically within the vending machine in proximity to and transversely of one end of a plurality of horizontal article storage trays arranged in tiered relationship such that said elevator will receive articles ejected from any of said storage trays and deliver said articles to a common machine discharge outlet comprising, in combination, a shelf, a guide rod mounted vertically within said vending machine, support means secured to said shelf adapted to loosely slide on said guide rod for reciprocal vertical guided travel of said shelf within the vending machine from the level of the lowermost tray to the machine discharge outlet such that said shelf is aligned with the machine discharge outlet at the height of its vertical travel, and means for positively ejecting the article carried by said tray from said tray through said tray discharge outlet.

34. In an elevator as claimed in claim 33, said article ejection means comprising means for pivotally mounting said shelf on said shelf support means, means for biasing said shelf in a normally at-rest article receiving and supporting position, and means for pivoting said shelf about its pivotal mount substantially at the height of the shelf vertical travel.

35. In an elevator as claimed in claim 34, said shelf ejecting means comprising pusher means pivotally mounted on the guide rod at an upper portion thereof, one end of said pusher means adapted to be engaged by the elevator shelf for guided travel thereon such that said pusher will travel from one end to the opposite end of said shelf for engagement with articles carried by said shelf for positive ejection of said articles through the machine discharge outlet substantially at the height of the vertical travel of the elevator.

36. A coin dispenser comprising a first plate having an opening formed therein, a second plate pivotally mounted on said first plate having an opening formed therein substantially of the diameter of the said first plate opening, means for biasing said second plate such that said second plate opening is normally in alignment with said first plate opening, coin storage means having a plurality of stacked coins disposed above said second plate having an opening formed therein normally out of alignment with said first plate opening, said coin storage means and said first plate bearing a predetermined spaced relation one to the other equal to at least the thickness of a coin in said coin storage means, solenoid actuated means for pivoting said second plate such that said second plate opening is aligned with said coin storage means opening permitting at least one coin to drop by gravity through said coin storage opening into said second plate opening, said plate bias means adapted to return said plate to its normally at-rest position for discharging the coin contained in the second plate opening through said first plate opening and means for pivotally mounting said second plate on said first plate such that the plane of said second plate is at an acute angle with the plane of said first plate.

37. In a coin dispenser as claimed in claim 36, means for rigidly mounting said dispenser on a support surface such that said coin storage means are disposed at an angle of about 45° to the horizontal plane.

38. A coin dispenser mechanism comprising a first plate having a circular opening formed therein, a second plate having a circular opening formed therein pivotally mounted on said first plate such that said second plate opening is normally aligned with said first plate opening, a third plate having an opening formed therein out of alignment with said first plate opening rigidly secured to said first plate a predetermined spaced distance therefrom, coin storage means disposed above said third plate opening in alignment therewith such that coins carried in said coin storage means can drop through said third plate opening, solenoid activated means for pivoting said second plate such that said second plate opening is aligned with said third plate opening for receiving at least one coin in said second plate opening, bias means for returning said second plate to its at-rest position such that said second plate opening is aligned with said first plate opening permitting said coin carried in said second plate opening to discharge through said first plate opening, means for disposing the plane of said second plate at an acute angle with the planes of said first and support third plates and means for positioning said coin mechanism storage means at an acute angle relative to the horizontal plane.

39. In a coin dispenser mechanism as claimed in claim 38, a spacer washer disposed between said second and first plates concentric with the pivotal mounting such that the plane of said second plate normally is disposed at an acute angle with the plane of said first plate.

40. Match dispensing means comprising storage means having an outlet end for stacking a plurality of match packs, means for biasing said stack of match packs towards said outlet end, detent means formed in the outlet end of said storage means adapted to close said discharge outlet to the axial discharge of said match packs, an ejector plate slidably mounted for reciprocal travel across the end of said discharge outlet, means for biasing said plate across said outlet for normally closing said outlet to the axial discharge of match packs for abutment with said detent means, and solenoid actuated means for retracting said ejector plate permitting a match pack to advance to abut the detent means, said ejector plate bias means being adapted to positively return the ejector plate to its at-rest position such that the pack of matches abutting said detent means is ejected from said storage means.

41. In match dispensing means as set forth in claim 40, said match pack storage means comprising a substantially circular column open on one side and said match pack bias means comprising an arm pivotally mounted concentric with said column having a depending portion adapted to be inserted into said column for engagement with match packs contained therein, and means for biasing said arm in the direction of the outlet end of said storage means.

42. In a coin dispenser mechanism as claimed in claim 38, said acute angle defined by the coin storage means relative to the horizontal plane being about 45°.

References Cited by the Examiner

UNITED STATES PATENTS

| | | | |
|---|---|---|---|
| 2,289,807 | 7/1942 | Schaevitz et al. | 221—129 X |
| 2,571,596 | 10/1951 | Meredith et al. | 133—2 |
| 2,738,050 | 3/1956 | Lovell | 133—2 |
| 2,954,037 | 9/1960 | Williams et al. | 133—2 |
| 2,965,262 | 12/1960 | Du Bois | 221—277 X |
| 2,973,075 | 2/1961 | Du Grenier et al. | 221—125 X |
| 3,002,602 | 10/1961 | Giepen | 194—10 |
| 3,056,530 | 10/1962 | Krier | 221—150 |
| 3,095,114 | 6/1963 | Tobias | 221—277 X |

RAPHAEL M. LUPO, *Primary Examiner.*

SAMUEL F. COLEMAN, LOUIS J. DEMBO, *Examiners.*